United States Patent
Gibson et al.

(10) Patent No.: US 11,736,053 B2
(45) Date of Patent: *Aug. 22, 2023

(54) METHOD FOR SELECTING A FREQUENCY CONVERTER FOR A REFRIGERANT COMPRESSOR UNIT

(71) Applicant: BITZER Kuehlmaschinenbau GmbH, Sindelfingen (DE)

(72) Inventors: John Gibson, Fuerth (DE); Tobias Hieble, Scheidegg (DE); Julian Pfaffl, Tuebingen (DE); Juergen Nill, Moessingen (DE); Ferdinand Breithuth, Tuebingen (DE)

(73) Assignee: BITZER Kuehlmaschinenbau GmbH, Sindelfingen (DE)

( * ) Notice: Subject to any disclaimer, the term of this patent is extended or adjusted under 35 U.S.C. 154(b) by 130 days.

This patent is subject to a terminal disclaimer.

(21) Appl. No.: 16/857,746

(22) Filed: Apr. 24, 2020

(65) Prior Publication Data
US 2020/0252018 A1    Aug. 6, 2020

Related U.S. Application Data

(63) Continuation of application No. PCT/EP2017/077658, filed on Oct. 27, 2017.

(51) Int. Cl.
    *H02P 27/04*    (2016.01)
(52) U.S. Cl.
    CPC .................. *H02P 27/047* (2013.01)
(58) Field of Classification Search
    CPC ...... H02P 27/047; H02P 29/032; H02P 23/00; F25B 2500/26; F25B 2600/021
    See application file for complete search history.

(56) References Cited

U.S. PATENT DOCUMENTS 5,796,237 A * 8/1998 Yamakawa ............... H02P 7/00
                                                      318/807
8,079,227 B2 * 12/2011 Crane ................... F25B 49/025
                                                       62/157
(Continued)

FOREIGN PATENT DOCUMENTS

EP         1624562 A1    2/2006
WO    WO 2010/043318 A1    4/2010

OTHER PUBLICATIONS

Dr John P Gibson, "Software allows the correct choice of suitable frequency inverters", Die KALTE+Klimatechnil Jun. 2013.
(Continued)

*Primary Examiner* — Bickey Dhakal
(74) *Attorney, Agent, or Firm* — Reinhart Boerner Van Deuren P.C.

(57) ABSTRACT

In order to improve a method for selecting a frequency converter for a refrigerant compressor unit comprising a refrigerant compressor and an electric drive motor in such a way that the frequency converter is optimised for the application in question, it is proposed that a working state suitable for the operation of the refrigerant compressor unit is selected in an application field of an application diagram of the refrigerant compressor, that an operating frequency is selected for this selected working state, and that, on the basis of drive data, a working state operating current value corresponding to the selected working state and the selected operating frequency is ascertained for the operation of the refrigerant compressor unit.

57 Claims, 17 Drawing Sheets

(56) References Cited

U.S. PATENT DOCUMENTS

| | | | |
|---|---|---|---|
| 8,790,089 B2* | 7/2014 | Moody | F04B 39/0207 |
| | | | 418/101 |
| 2005/0068001 A1* | 3/2005 | Skaug | H02M 7/53873 |
| | | | 318/807 |
| 2011/0074317 A1 | 3/2011 | Gibson et al. | |
| 2014/0196490 A1* | 7/2014 | Nemit, Jr. | F04B 35/04 |
| | | | 62/126 |
| 2014/0271232 A1* | 9/2014 | Kopko | F04D 27/0261 |
| | | | 417/44.1 |
| 2016/0204728 A1 | 7/2016 | Notohara et al. | |

OTHER PUBLICATIONS

Asercom, Guide-Book, Recommendations for using Frequency Inverters with Positive Displacement Refrigerant Compressors, Apr. 2018, 20 pages.

Dr. John P. Gibson (Ph.D.), Frequency Inverters and Interaction with Refrigerant Compressors, Art of Compression Colliquium, May 3, 2012, 27 pages.

GEA Refrigeration Technologies, GEA Bock Software VAP 11 (Online), Jun. 2014, 15 pages.

Asercom, Guide-Book, Recommendations on the Operations of Frequency Converters, Refrigeration Compressors that Operate according to the Displacement Principle, Apr. 2012, 17 pages.

* cited by examiner

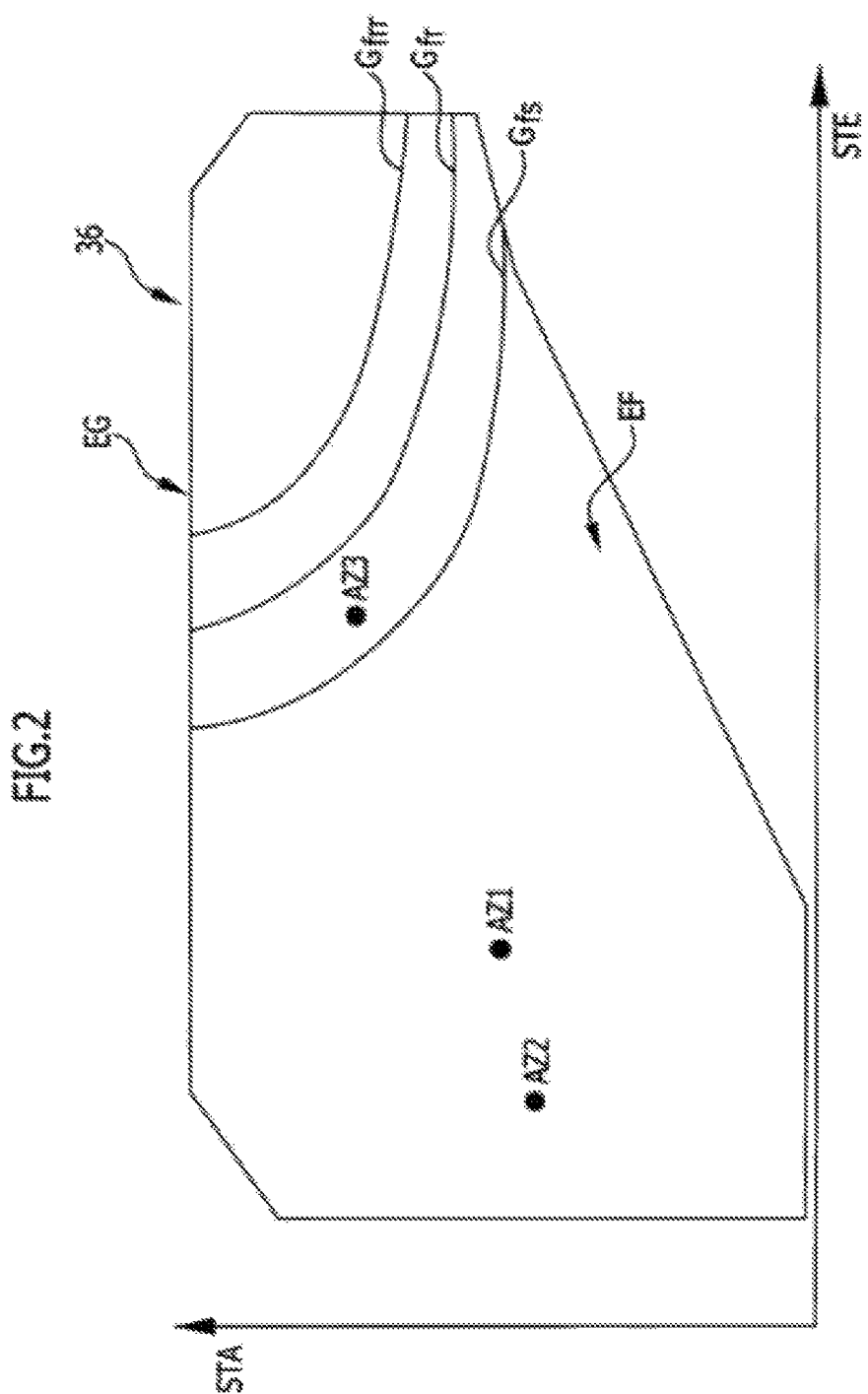

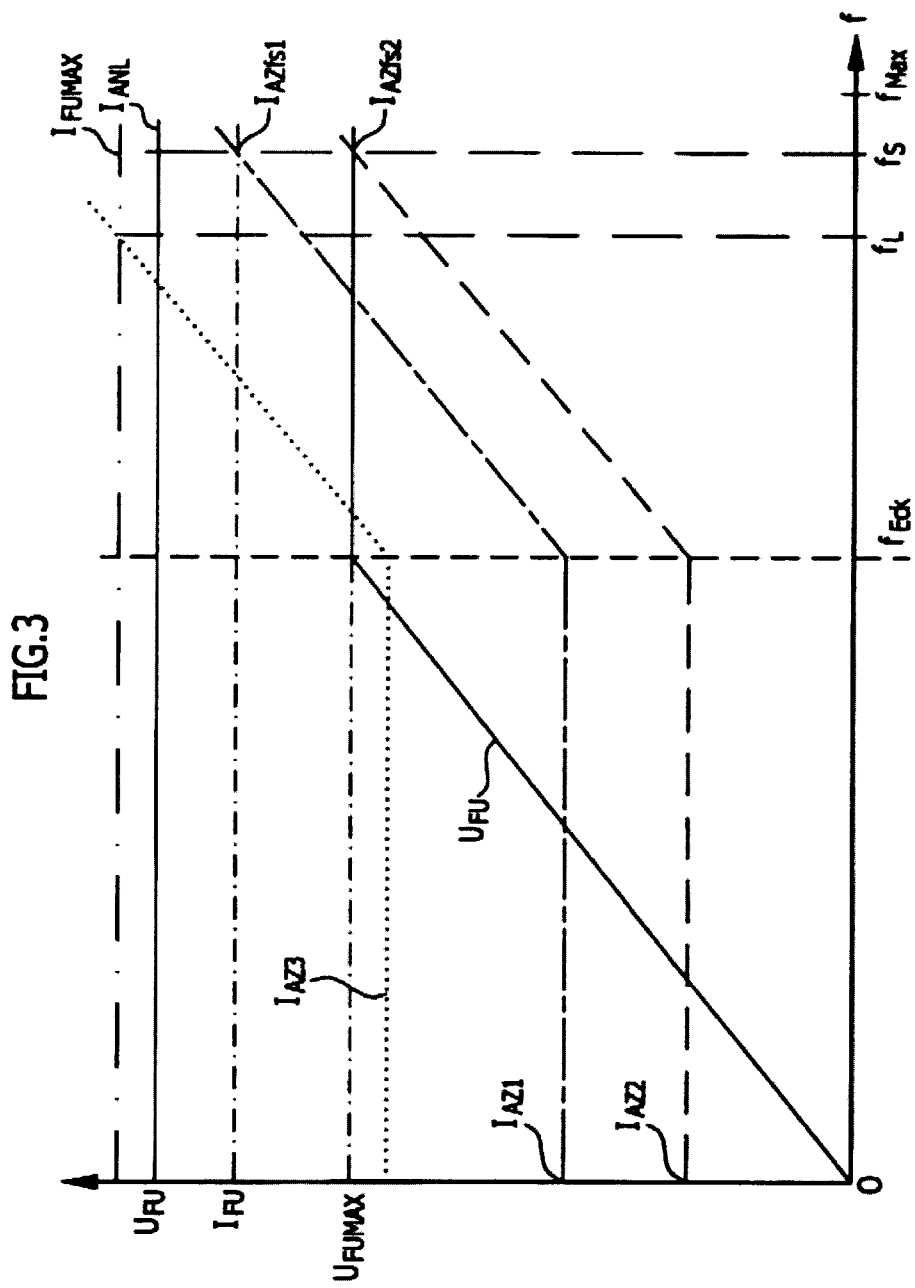

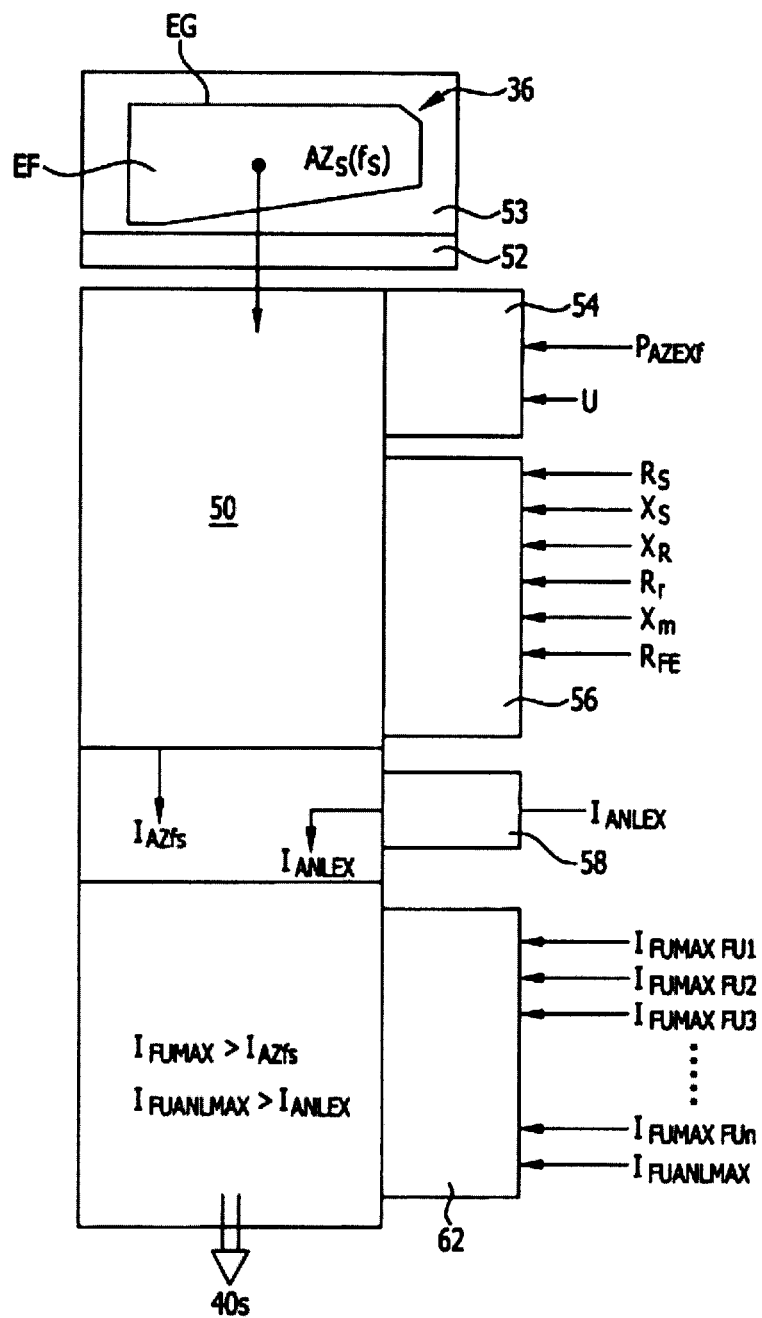

FIG.5

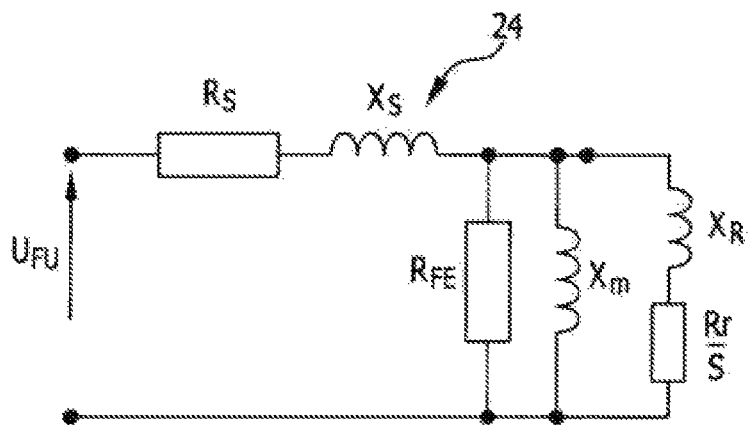

$U_{FU}$ = Output voltage of the frequency converter
$R_S$ = Stator resistance
$X_S$ = Stator reactance
$X_S$ = Rotor reactance
$R_r$ = Rotor resistance
$X_m$ = Magnetisation resistance
$R_{FE}$ = Iron resistance
$S$ = Slip
$Z$ = Motor impedance $$Z = R_S + jX_S + \frac{\left(\frac{jX_m \cdot R_{FE}}{jX_m + R_{FE}}\right)\left(jX_R + \frac{R_r}{S}\right)}{\left(\frac{jX_m \cdot R_{FE}}{jX_m + R_{FE}}\right) + jX_R + \frac{R_r}{S}} \quad (F1)$$

$$P_{AZEXfs} = P_{AZ} = U_{FU} \cdot I_{AZ} \cdot \sqrt{3} \; \arctan \frac{Im(Z)}{Re(Z)} \quad (F2)$$

$$I_{AZfs} = \frac{U_{FU}}{\sqrt{3}} \cdot \frac{1}{\sqrt{Im(Z)^2 + Re(Z)^2}} \quad (F3)$$

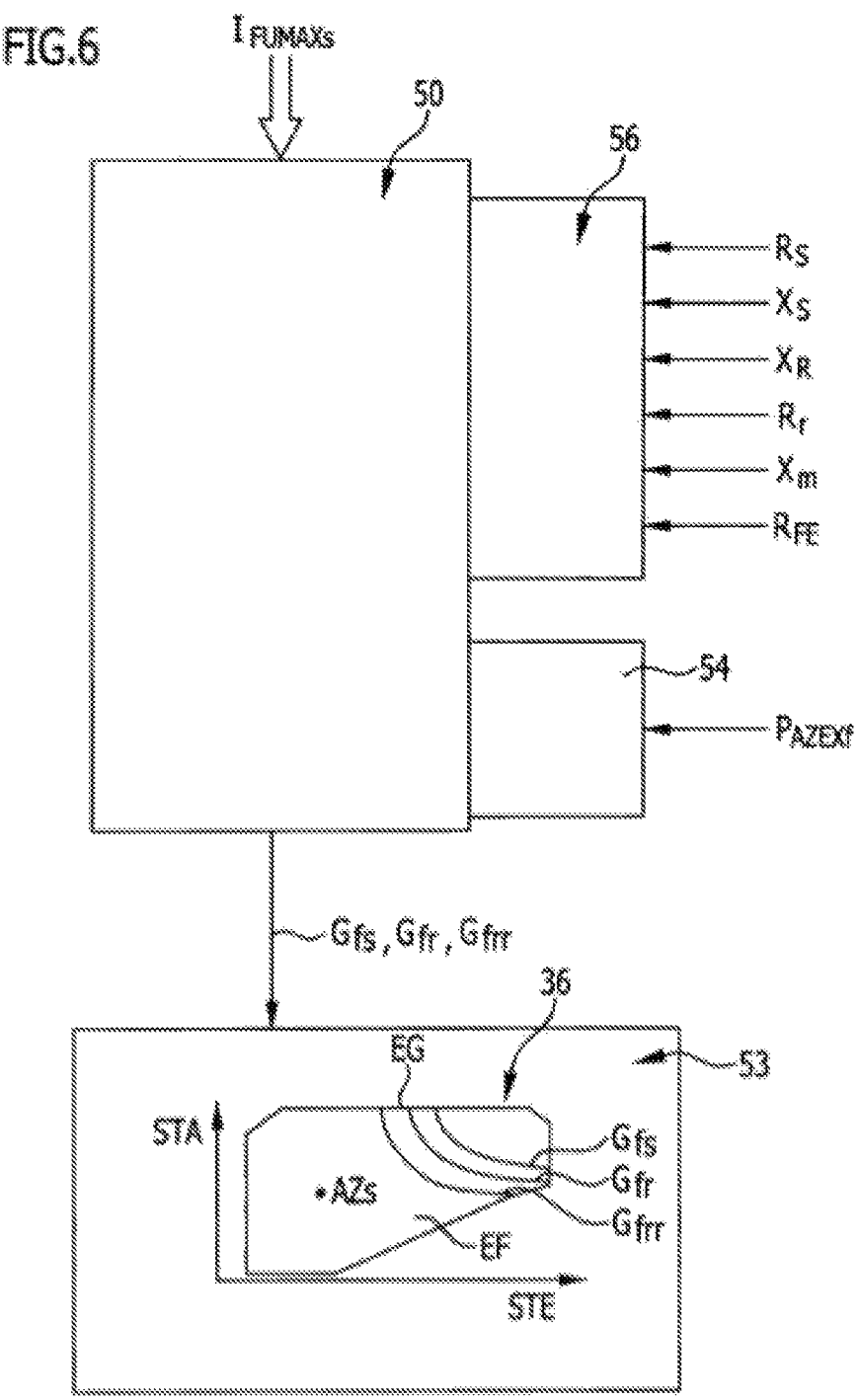

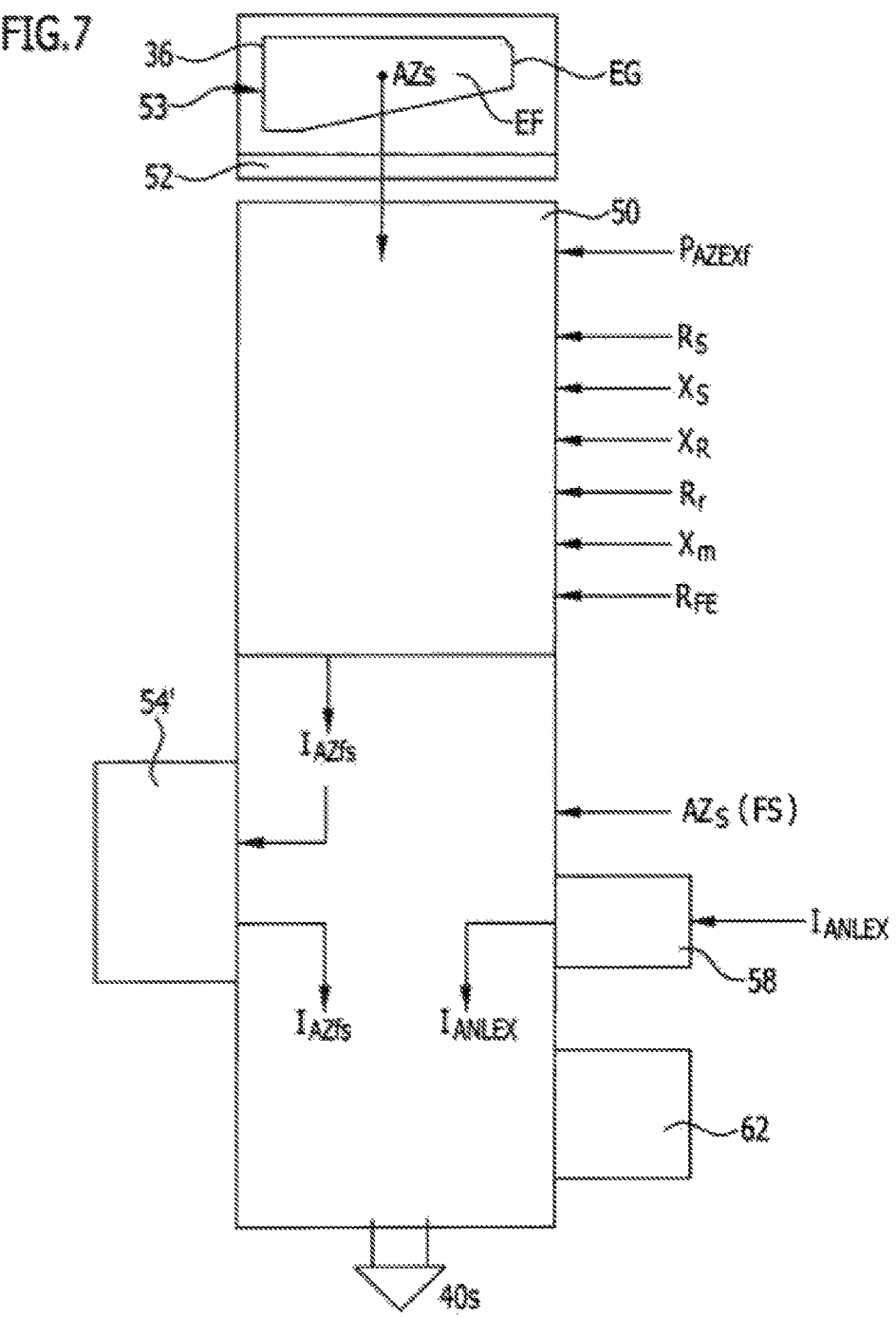

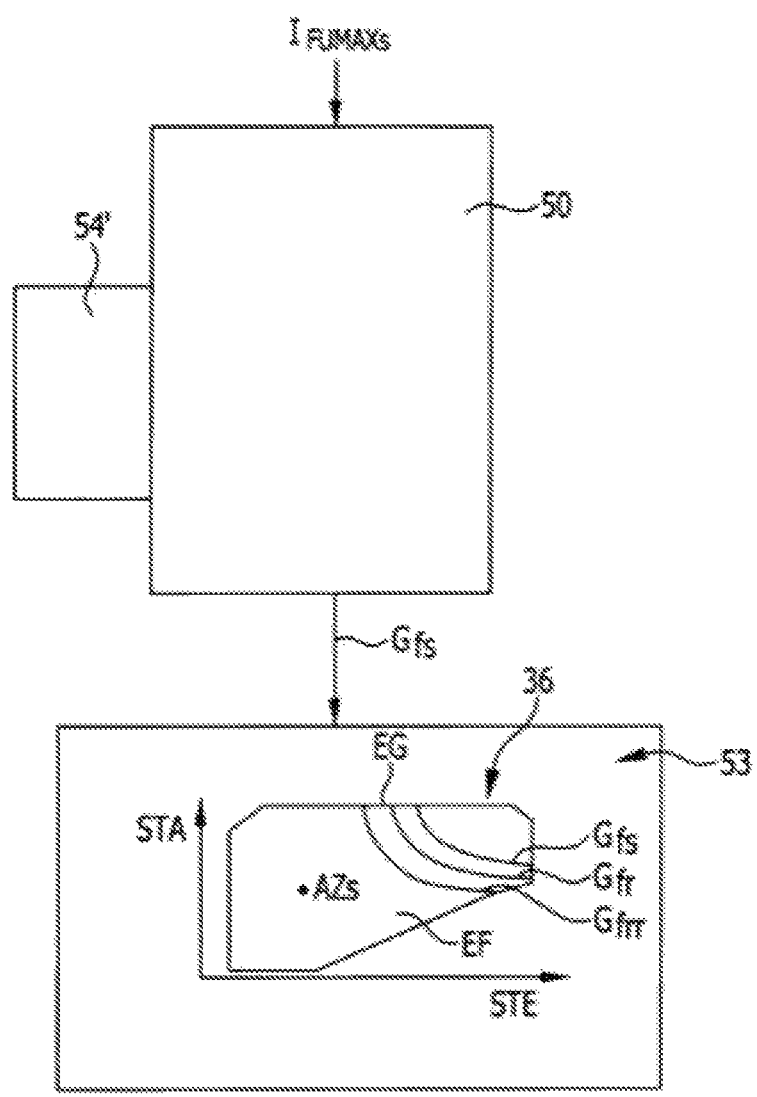

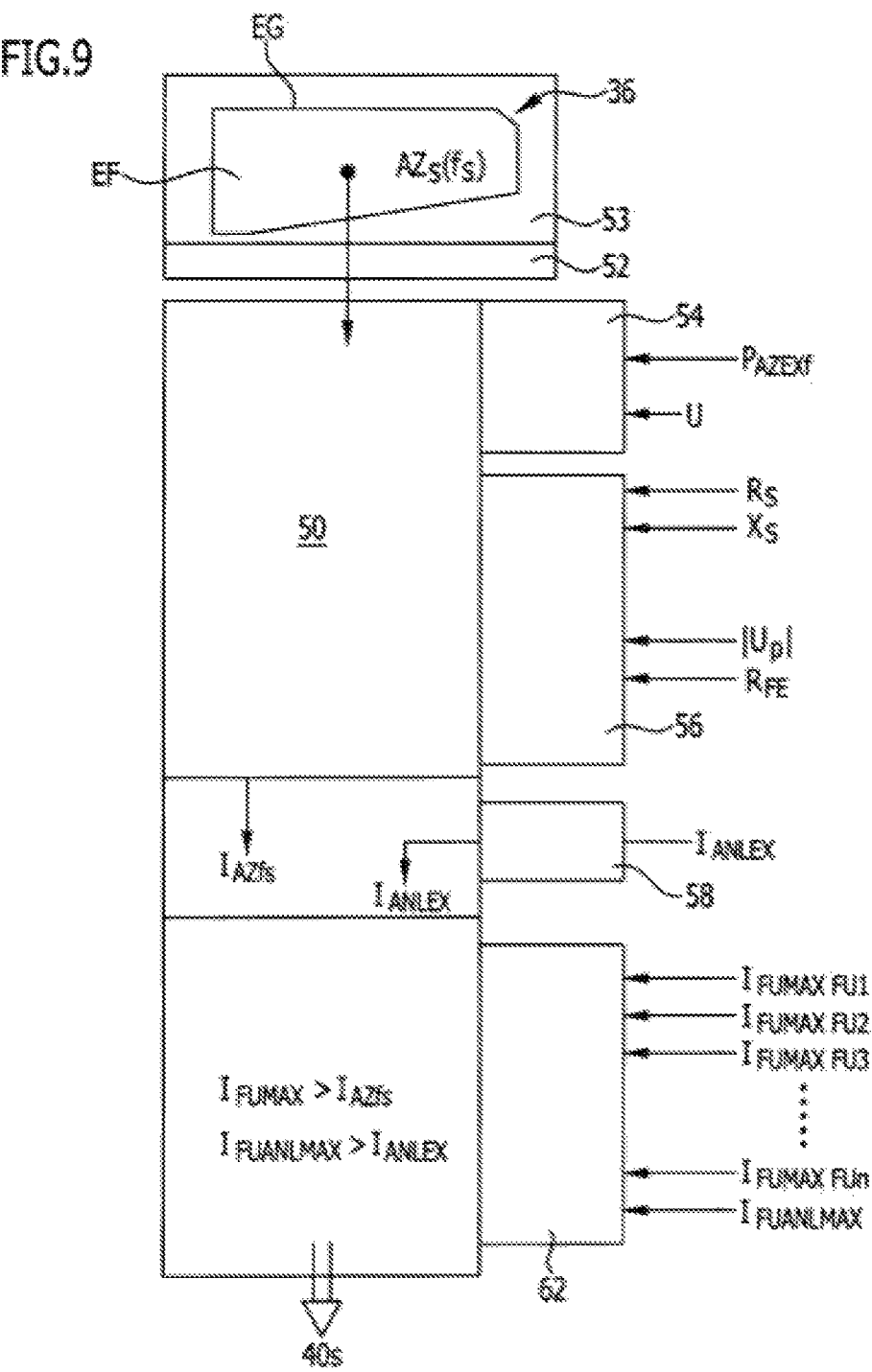

FIG.10

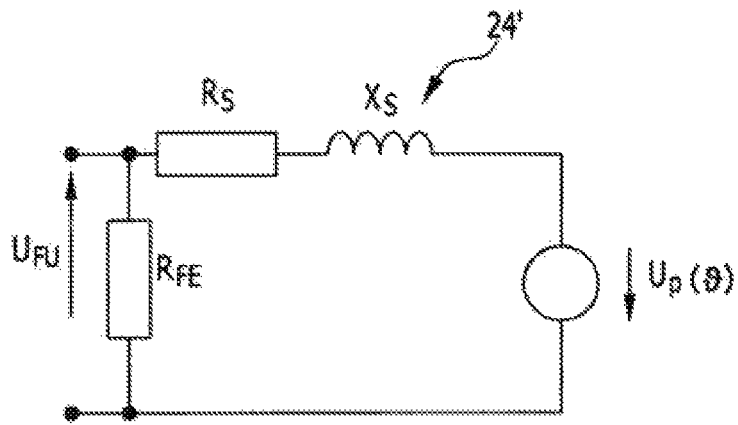

$U_{FU}$ = Output voltage of the frequency converter
$R_S$ = Stator resistance
$X_S$ = Stator reactance
$U_p(\vartheta)$ = Synchronous generated voltage (complex)
$\vartheta$ = Load angle
$|U_p|$ = Absolute value, synchronous generated voltage, for example determined experimentally
$|I_{AZ}|$ = Absolute value, working state operating current value $$U_p(\vartheta) = |U_p|(\cos(\vartheta) + j\sin(\vartheta)) \quad (P1)$$

$$P_{AZEXfs} = P_{AZ} = U_{FU} \cdot |I_{AZ}| \cdot 3 \frac{RE(I_{AZ})}{\sqrt{RE(I_{AZ})^2 - Im(I_{AZ})^2}} \quad (P2)$$

$$I_{AZ} = \frac{U_{FU}}{R_{FE}} \cdot \frac{(U_{FU} - |U_p|(\cos(\vartheta) + j\sin(\vartheta)))}{(R_S + jX_S)} \quad (P3)$$

$$|I_{AZ}| = \sqrt{Im(I_{AZ})^2 + RE(I_{AZ})^2} \quad (P4)$$

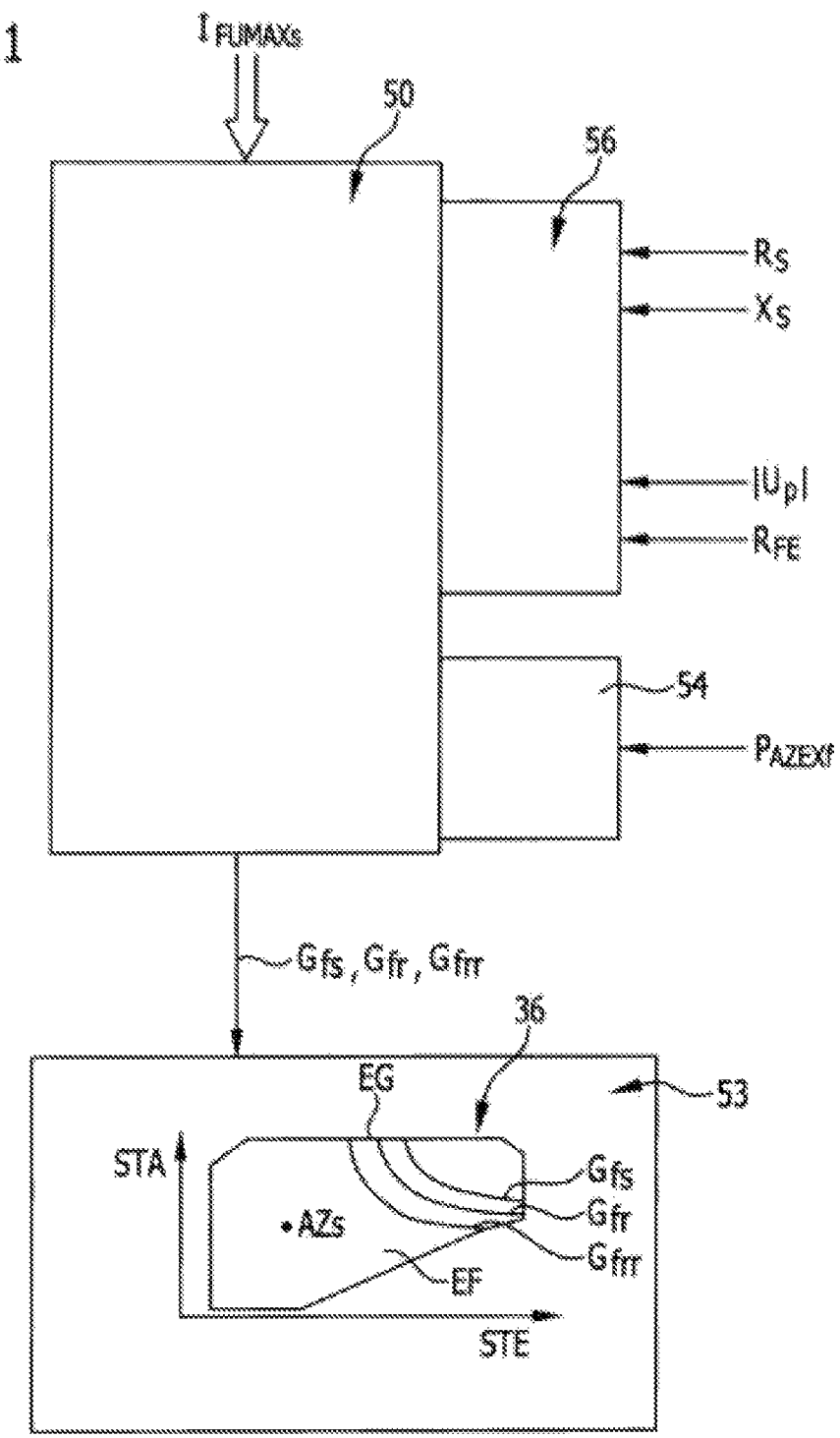

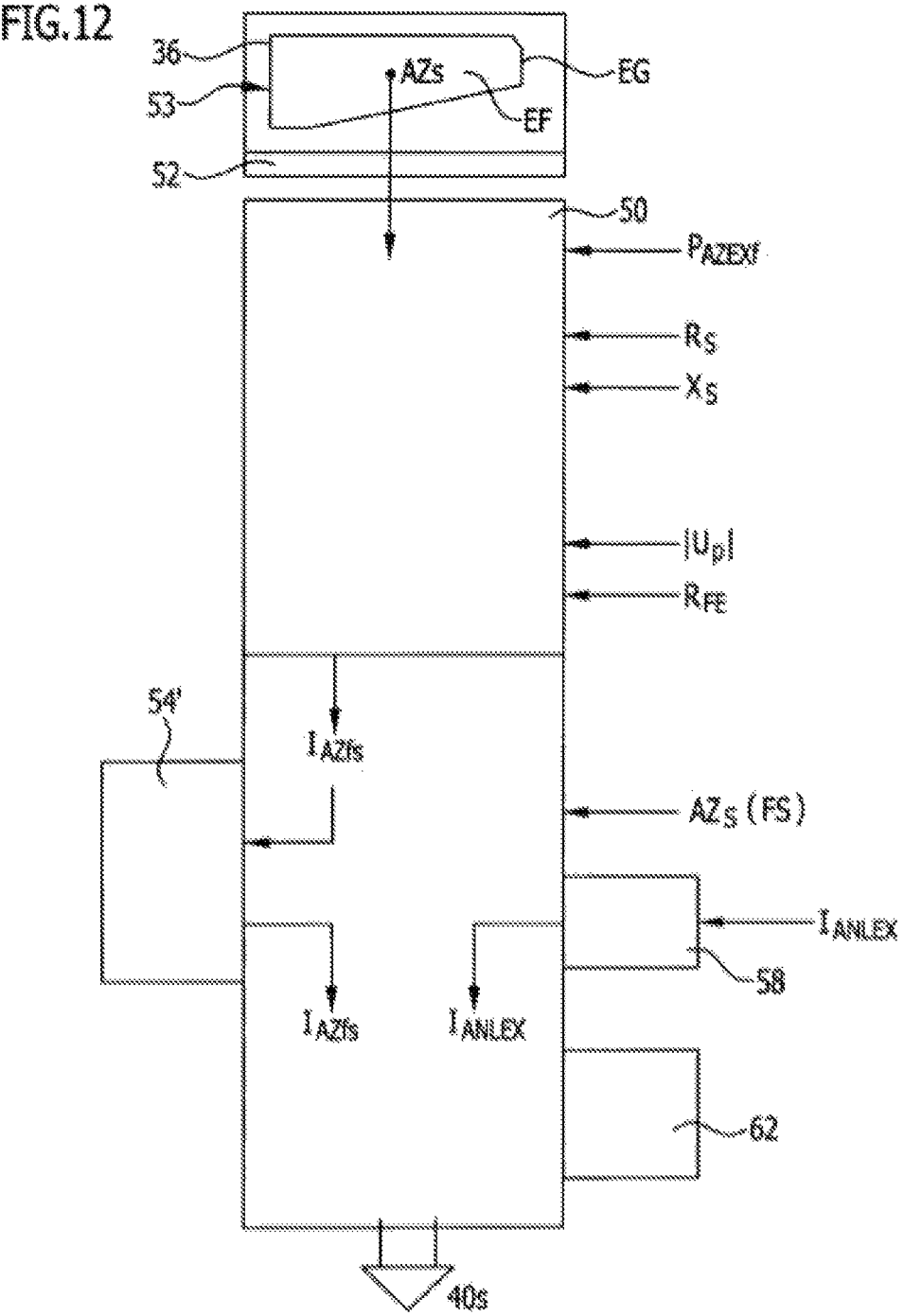

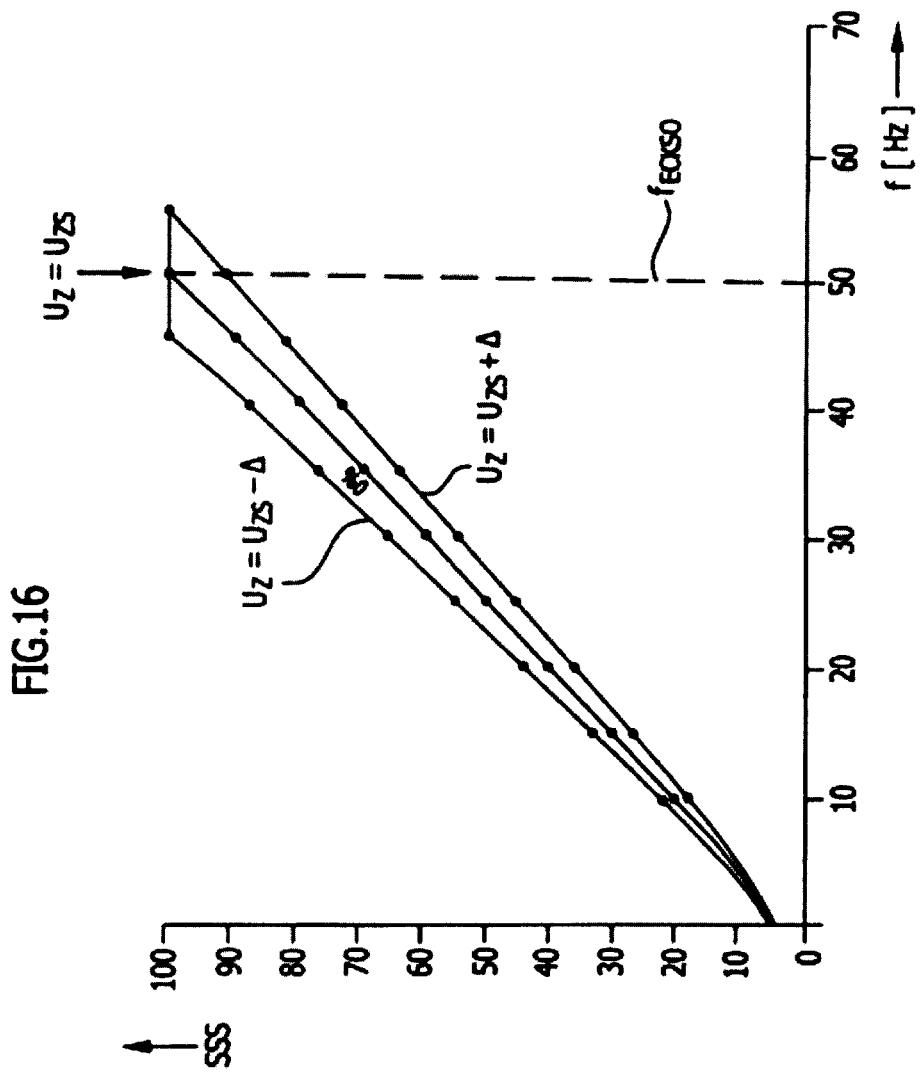

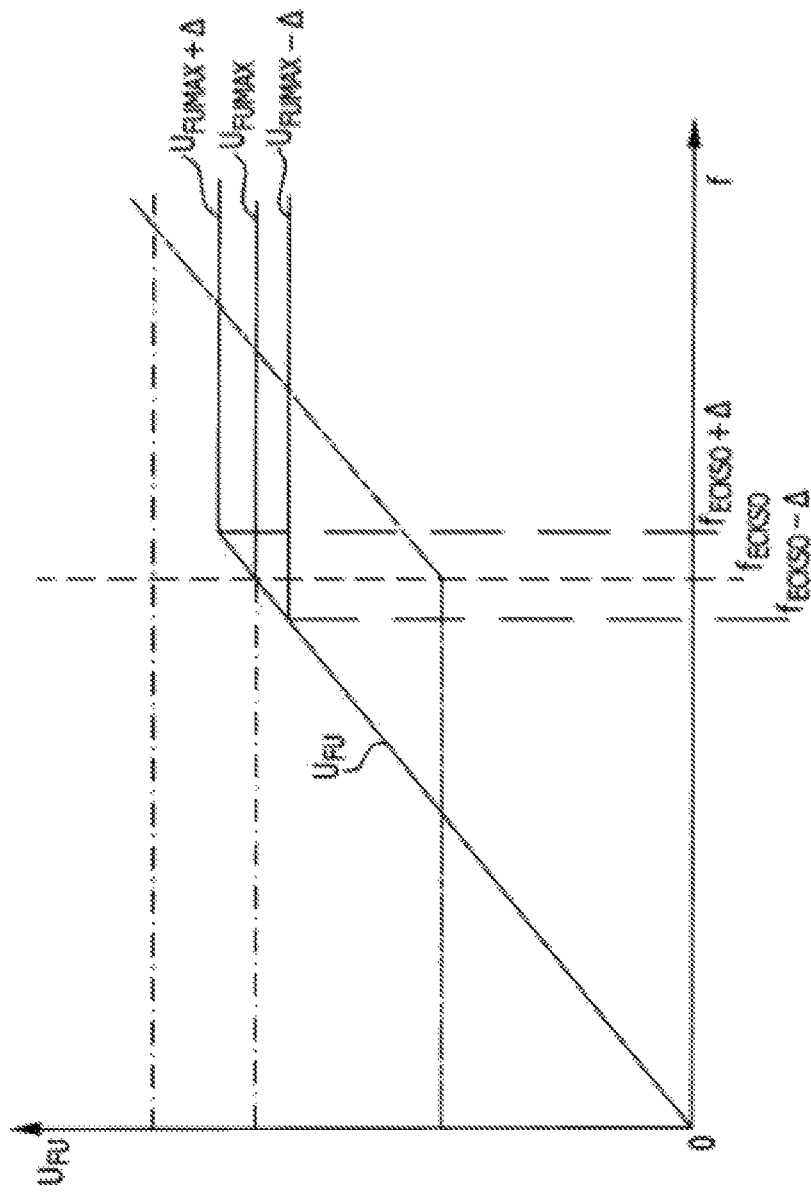

METHOD FOR SELECTING A FREQUENCY CONVERTER FOR A REFRIGERANT COMPRESSOR UNIT

CROSS-REFERENCE TO RELATED PATENT APPLICATION

This application is a continuation of International application number PCT/EP2017/077658 filed on Oct. 27, 2017.

This patent application claims the benefit of International application No. PCT/EP2017/077658 of Oct. 27, 2017, the teachings and disclosure of which are hereby incorporated in their entirety by reference thereto.

BACKGROUND OF THE INVENTION

The invention relates to a method for selecting a frequency converter for a refrigerant compressor unit, comprising a refrigerant compressor and an electric drive motor.

Previously, the frequency converters for refrigerant compressor units were always selected such that the frequency converter did not limit the potential working states of the refrigerant compressor.

The result of this is that, in the previously known methods for selecting the frequency converter, frequency converters that incurred unnecessary costs were always used.

SUMMARY OF THE INVENTION

The object of the invention is therefore to improve a method for selecting a frequency converter such that the frequency converter is selected so as to be optimised for the application in question.

In a method of the kind described in the introduction, this object is achieved in accordance with the invention in that a working state suitable for the operation of the refrigerant compressor unit is selected in an application field of an application diagram of the refrigerant compressor, in that an operating frequency is selected for this selected working state, and in that, on the basis of drive data, a working state operating current value corresponding to the selected working state and the selected operating frequency is ascertained for the operation of the refrigerant compressor unit.

The advantage of the solution according to the invention is considered to lie in the fact that the working state operating current value creates a benchmark for the selection of the frequency converter, which benchmark makes it possible to determine the frequency converter in a simple way, for example insofar as the frequency converter to be selected must at least be able to generate a current at the output corresponding to the working state operating current value.

For example, with the solution according to the invention, the drive data are determined beforehand, in particular also depending on the refrigerant, and in particular are stored for later use when selecting the frequency converter.

The frequency converter may then be selected particularly easily if, on the basis of the working state operating current value, the frequency converter of which the maximum converter current value is equal to or greater than the working state operating current value is selected from data for those frequency converters that are available for selection.

For example, for this purpose the data of the potential frequency converters are compiled in a list, which in particular is available as a stored file.

With this approach, the selection of the suitable frequency converter can thus be optimised insofar as the suitable frequency converter is selected such that its maximum converter current value is sufficient to reliably operate the refrigerant compressor unit in the selected working state at the selected operating frequency, however an unnecessary over specification of the frequency converter is avoided, and therefore the frequency converter that is the most economical for reliable operation is selected.

For the optimisation of the selection of the frequency converter, it is also advantageous if the frequency converter of which the maximum converter current value is closest to the working state operating current value is selected.

It is thus ensured that the frequency converter is not overspecified in respect of the maximum converter current value.

With such a focusing of the configuration of the frequency converter in respect of the maximum converter current value, it could be the case that the frequency converter is unable to provide the start-up current value for the refrigerant compressor unit.

For this reason, it is preferably provided that the frequency converter is selected such that its maximum converter start-up current value is equal to or greater than a start-up current value of the refrigerant compressor unit.

In this case, a stored start-up current value is preferably consulted for the selection of the frequency converter.

No further details have yet been provided in respect of the way in which the start-up current value is determined.

In accordance with an advantageous solution, the start-up current value is determined experimentally and in particular is then stored so as to be available for the selection of the frequency converter.

It is thus ensured that the start-up current value corresponds to the actual conditions of the refrigerant compressor unit.

In order to also furthermore optimise the selection of the frequency converter in respect of the start-up current value, it is preferably provided that the frequency converter is selected such that its maximum converter start-up current value is as close as possible to the start-up current value, such that the maximum converter current value of the frequency converter is not unnecessarily overspecified in this respect either.

It is particularly expedient if the frequency converter is selected such that its maximum converter current value is as close as possible to the higher of the values of the working state operating current and start-up current, such that the configuration of the frequency converter in respect of its maximum converter current value is thus optimised to the selected working state.

No further details have yet been provided in respect of the drive data.

A solution that reflects reality particularly well provides that the drive data are determined experimentally.

Furthermore, an advantageous solution provides that experimental drive data for the possible operating frequencies to be selected are stored for each working state of the refrigerant compressor unit.

Likewise, no further details have yet been provided in respect of the operating frequencies that are to be selected.

In accordance with an advantageous solution, the operating frequency to be selected lies in the range of from 0 hertz to 140 hertz.

The operating frequency to be selected preferably lies in the range from a cut-off frequency of the frequency converter up to a frequency of 140 hertz, preferably up to 90 hertz.

The drive data also have not yet been specified in greater detail.

In accordance with an approach that is easily realised, the drive data comprise the experimentally determined electrical power consumption for each working state in the application field at the various operating frequencies.

In this case it is possible in particular to calculate the working state operating current value at the selected operating frequency on the basis of the experimentally ascertained electrical power consumption at the particular operating frequency taking into consideration an equivalent circuit of the drive motor of the refrigerant compressor unit.

The working state operating current value is calculated in particular by taking into consideration the impedance of the equivalent circuit of the drive motor in order to ascertain the working state operating current value.

It is furthermore preferably provided that, in order to ascertain the working state operating current value, the experimentally ascertained power consumption of the refrigerant compressor unit is compared with the power consumption resulting from the equivalent circuit, and on this basis the slip or load angle is ascertained, such that all parameters for complete calculation of the working state operating current value are thus provided.

The working state operating current value can thus be ascertained in particular on the basis of the ascertained slip or load angle and the impedance of the equivalent circuit of the drive motor.

A further possibility for optimising the selection of the frequency converter is that of minimising the working state operating current value by varying the output voltage of the frequency converter.

In other words, on the basis of the relationship with the working state operating current value, which relationship is defined by the equivalent circuit, and on the basis of the output voltage of the frequency converter, it is possible to minimise the working state operating current value by changing the output voltage of the frequency converter, such that, when selecting or configuring the frequency converter, it is possible to select a frequency converter or a setting of a frequency converter of which the output value has a value leading to a minimal working state operating current value, and this may also be taken into consideration in turn when selecting the frequency converter.

For example, it is thus possible to select the most economical frequency converter possible.

No further specific details have yet been provided in respect of the experimentally ascertained, stored drive data.

In accordance with an advantageous solution, the experimentally determined electrical power consumption of each working state in the application field at the particular operating frequency is captured, in particular stored.

When ascertaining the working state operating current value, the calculation thereof starting from the electrical power consumption is also necessary, since merely the stored electrical power consumption for the selected working state is available in a memory.

Alternatively, in accordance with another advantageous solution, the working state operating current values calculated from the experimentally ascertained power consumption are captured, in particular stored, for the particular working state and the particular operating frequency.

In other words, for each working state and each operating frequency, the working state operating current values are already calculated and stored, such that, when selecting the frequency converter, the working state operating current values already stored can be directly accessed and there is no need to calculate them in addition prior to the selection.

In accordance with a further advantageous solution, the working state operating current value is experimentally ascertained and captured, in particular stored, for each working state and for each operating frequency.

This approach is more complex in respect of the experimental ascertainment of the working state operating current value, however it eradicates the need to calculate the working state operating current value from the electrical power consumption and to consult the equivalent circuit, and therefore may represent a favourable solution in specific circumstances or with a specific kind of equivalent circuit.

Since the method according to the invention for selecting a frequency converter is limited to the working states of the refrigerant compressor available in the application field of the application diagram, it is preferably provided that, on the basis of the maximum converter current value of the selected frequency converter, the working states belonging to this maximum converter current value in the application field at a selected operating frequency are ascertained with the aid of the drive data.

This ascertainment of the working states starting from the maximum converter current value determined in accordance with the selection of the frequency converter has the great advantage that there may thus be determined the restrictions of the application field and of the working states achievable in the application field, these restrictions being brought about by the selection according to the invention of the frequency converter.

It is preferably provided in this regard that the working states ascertained in respect of the maximum converter current value are displayed visually in the application diagram.

In particular, a conventional display unit is provided for this purpose, which on the one hand displays the application diagram and on the other hand displays the working states forming a limitation of the application field in the application diagram.

In conjunction with the previous explanation of the solution according to the invention, it is assumed that no further specifications apply for the frequency converters available for selection.

This has the disadvantage, however, that, on account of the restrictions of the application field, working states may occur in which the working state operating current value at high operating frequencies exceeds the maximum converter current value.

In the case of a conventional frequency converter, this usually leads to a transfer into a malfunction mode in order to protect the frequency converter.

In accordance with a particularly advantageous embodiment of the method according to the invention, however, there are available for selection only frequency converters that comprise a frequency-limiting unit, which, at operating frequencies above a cut-off frequency, limits the operating frequency in such a way that the maximum converter current value of the frequency converter is not exceeded.

A frequency-limiting unit of this kind thus has the advantage that, in spite of the selection of the frequency inverter according to the invention, working states of the refrigerant compressor unit which cannot be achieved across the entire frequency range, in particular not at operating frequencies above the cut-off frequency, are still allowed, however, if such working states are in fact achieved, the frequency converter itself limits the operating frequency in such a way that there is no transfer into the malfunction mode.

In particular, it is provided in this regard that the working state operating current value of the frequency converter is continuously detected by the frequency-limiting unit.

In this case, it is then possible in particular that the working state operating current value of the frequency converter is compared with a current reference value, and the operating frequency is limited to a limit frequency which is present when the current reference value is reached.

The current reference value in the simplest case is the maximum converter current value.

In order, however, to also detect the situation in which a maximum compressor operating current value defined specifically for the refrigerant compressor unit is not exceeded, it is preferably provided that the frequency-limiting unit takes into consideration both the maximum converter current value and also the maximum compressor operating current value as current reference value and determines the limit frequency on the basis of the lowest of the maximum current values.

It is thus ensured that the selected frequency converter does not malfunction, even under the working states achievable only at certain operating frequencies, but instead allows these working states of the refrigerant compressor to be achieved, although only in a limited range of the operating frequencies.

In addition, in the method according to the invention it is also provided that there is available for selection only a frequency converter in which a voltage adjustment unit brings about an increase in the output voltage with reference to the operating frequency, independently of a fluctuation of a mains voltage.

This solution has the advantage that the selected frequency converter, also in the event of a fluctuating mains voltage, in particular with fluctuations by up to 20%, does not change the increase in the output voltage of the frequency converter with reference to the operating frequency, which increase is essential for the flow in the drive motor of the refrigerant compressor unit, but instead keeps this increase constant.

This is achieved in particular in that an intermediate circuit voltage of the frequency converter is measured and, by way of a comparison with at least one reference value, a voltage curve of the output voltage of the frequency converter is corrected in order to keep the increase of the output voltage with reference to the operating frequency constant.

In this case, in particular the intermediate circuit voltage represents a voltage that is favourable for the method according to the invention, since it is proportional to the mains voltage and thus also directly reflects the fluctuations of the mains voltage.

In addition, the invention relates to a method performed by a data processing unit, which method comprises the method steps according to any one of claims 1 to 28.

In addition, the invention relates to a computer program product comprising commands which, when the program is run by a computer, cause the computer to carry out the method according to any one of claims 1 to 28.

The invention furthermore relates to a data processing unit according to the features of claims 29 to 55, wherein, with regard to the advantages of the data processing unit, reference is made to the corresponding descriptions of the method according to the invention.

The invention also relates, independently of the above-described solutions or also in combination therewith, to a refrigerant compressor system comprising a refrigerant compressor unit having a refrigerant compressor and an electric drive motor and also comprising a frequency converter for operating the electric drive motor, wherein the frequency converter comprises a frequency-limiting unit, which at operating frequencies above a cut-off frequency limits the operating frequency in such a way that the maximum converter current value of the frequency converter is not exceeded.

A frequency-limiting unit of this kind thus has the advantage that, with it and without any particular intervention, operation of the refrigerant compressor system in working states of the refrigerant compressor which cannot be achieved across the entire frequency range, in particular not at all operating frequencies lying above the cut-off frequency, can be achieved with the available maximum converter operating current, since when such working states are achieved the frequency converter itself limits the operating frequency in such a way that there is no transfer into the malfunction mode.

In particular, it is provided in this regard that the working state operating current value of the frequency converter is detected continuously by the frequency-limiting unit.

In this case, it is possible in particular that the working state operating current value of the frequency converter is compared with a current reference value, and the operating frequency is limited to a limit frequency which is present when the current reference value is reached.

The current reference value in the simplest case is the maximum converter current value.

In order, however, to also detect the situation in which a maximum compressor operating current value defined specifically for the refrigerant compressor unit is not exceeded, it is preferably provided that the frequency-limiting unit considers both the maximum converter current value and also the maximum compressor operating current value as current reference value and determines the limit frequency on the basis of the lowest of the maximum current values.

It is thus ensured that the selected frequency converter does not malfunction, even under the working states achievable only at certain operating frequencies, but instead allows these working states of the refrigerant compressor to be achieved, although only in a limited range of the operating frequencies.

The invention also relates, independently of the above-described solutions or also in combination therewith, to a refrigerant compressor system comprising a refrigerant compressor unit having a refrigerant compressor and an electric drive motor and also comprising a frequency converter for operating the electric drive motor, wherein the frequency converter comprises a voltage adjustment unit which controls an increase of the output voltage with reference to the operating frequency such that this increase occurs independently of a fluctuation of a mains voltage.

This solution has the advantage that the selected frequency converter, even in the event of a fluctuating mains voltage, in particular with fluctuations by up to 20%, does not vary the increase in the output voltage of the frequency converter with reference to the operating frequency, which increase is essential for the flow in the drive motor of the refrigerant compressor unit, but instead keeps this increase constant.

This is achieved in particular in that the voltage adjustment unit detects an intermediate circuit voltage of the frequency converter and, by way of a comparison with at least one reference value, the increase of the output voltage of the frequency converter in the event of deviations from the at least one reference value is corrected in order to keep constant the increase of the output voltage with reference to the operating frequency.

In this case, in particular the intermediate circuit voltage represents a voltage that is favourable for the method according to the invention, since it is proportional to the mains voltage and thus also directly reflects the fluctuations of the mains voltage.

The correction of the increase in the output voltage with reference to the operating frequency can be achieved easily if the voltage adjustment unit generates a proportionality factor with which the increase in the output voltage of the frequency converter is corrected.

No specific details have yet been provided in respect of the reference values.

It has proven to be favourable if the reference values used by the voltage adjustment unit comprise at least one of the values as follows: a reference frequency, a proportionality factor, and an intermediate circuit voltage setpoint value.

In accordance with a solution that is advantageous for the correction of the increase in the output voltage, the frequency converter comprises a frequency converter controller, which on the basis of a frequency request signal generates a voltage control signal which is fed, in addition to the frequency request signal, to an inverter stage controller of an inverter stage of the frequency converter, and the voltage adjustment unit cooperates with the frequency converter controller in order to control the increase in the output voltage with reference to the operating frequency.

With regard to the configuration of the frequency converter controller it is preferably provided that the frequency converter controller has a proportional member which, on the basis of the frequency request signal of the voltage control signal, generates the voltage control signal, and that the voltage adjustment unit corrects a proportionality behaviour of the proportional member.

In particular, it is provided here that the proportionality behaviour of the proportional member is corrected using the proportionality correction factor.

Further features and advantages are the subject of the following description and the schematic illustration of a number of exemplary embodiments.

BRIEF DESCRIPTION OF THE DRAWINGS

FIG. 2 shows a schematic depiction of an application diagram of the refrigerant compressor unit with an application field which is enclosed by an application limit and which defines the allowed working states of the refrigerant compressor unit;

FIG. 3 shows a depiction of a curve of an output voltage of the frequency converter with reference to an operating frequency and a curve of a working state operating current value with reference to the operating frequency;

FIG. 4 shows a schematic depiction of a data processing unit for the optimal selection of a frequency converter in accordance with a first exemplary embodiment of the solution according to the invention;

FIG. 5 shows a depiction of an equivalent circuit of a drive motor, formed as an asynchronous motor, of the refrigerant compressor unit, showing the equations for a motor impedance, an electrical power consumption, and a working state operating current value at a certain operating frequency;

FIG. 6 shows a schematic depiction of a method according to the invention for ascertaining limitations of the application field caused by the selection according to the invention of the frequency converter in accordance with the first exemplary embodiment;

FIG. 7 shows a schematic depiction of a second exemplary embodiment of a method according to the invention for selecting a frequency converter;

FIG. 8 shows a schematic depiction of the second exemplary embodiment of the frequency converter according to the invention when determining the restrictions of the application field;

FIG. 9 shows a schematic depiction of a data processing unit for the optimal selection of a frequency converter in accordance with a fourth exemplary embodiment of the solution according to the invention;

FIG. 10 shows a depiction of an equivalent circuit of a drive motor, formed as a synchronous motor or permanent-magnet synchronous motor, of the refrigerant compressor unit, showing the equations for a synchronous generated voltage, an electrical power consumption, and a working state operating current value at a certain operating frequency;

FIG. 11 shows a schematic depiction of a method according to the invention for ascertaining restrictions of the application field caused by the selection according to the invention of the frequency converter in accordance with the fourth exemplary embodiment;

FIG. 12 shows a schematic depiction of a fifth exemplary embodiment of a method according to the invention for selecting a frequency converter;

FIG. 16 shows a schematic depiction of a voltage control signal for the frequency converter with reference to the operating frequency; and FIG. 17 shows a depiction of output voltages of the frequency converter similarly to FIG. 3 in the case of a fluctuating mains voltage;

DETAILED DESCRIPTION OF THE INVENTION

Figure 1:
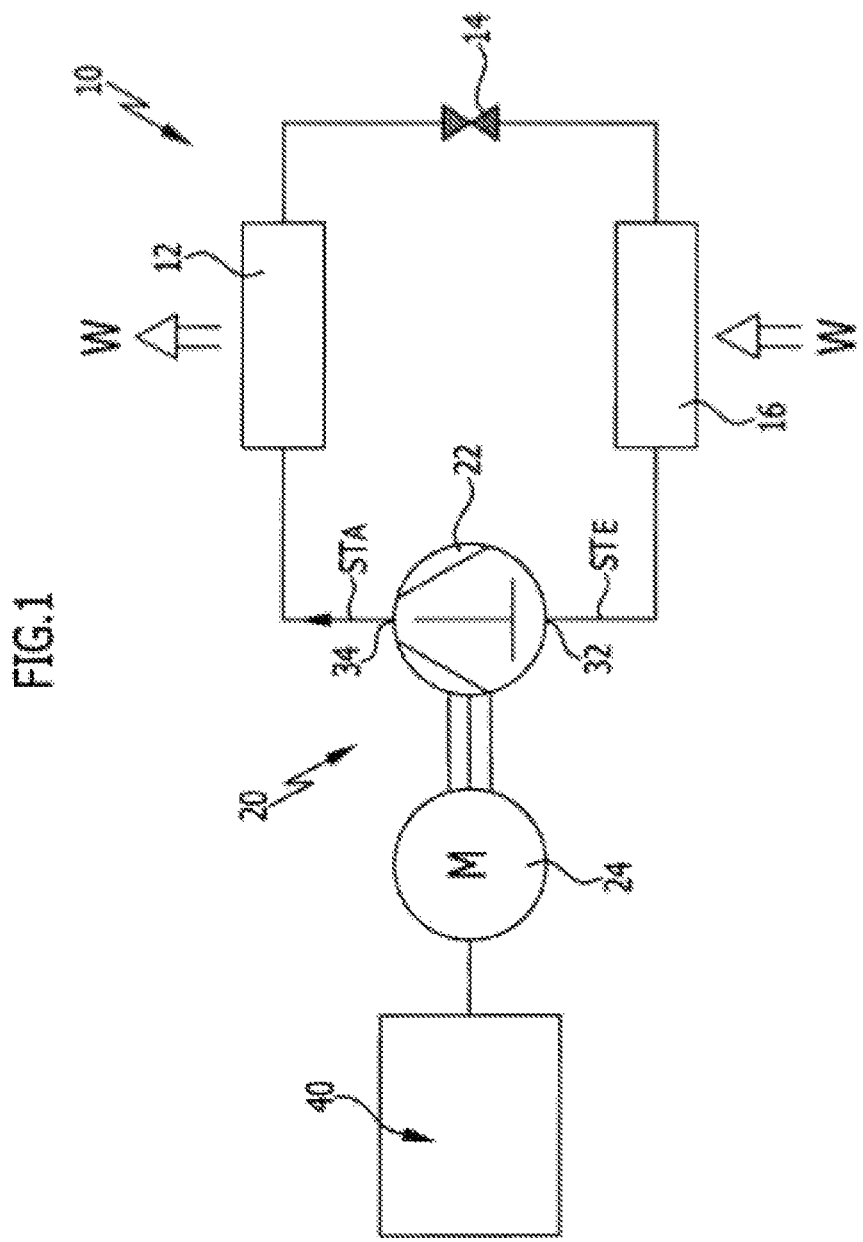
FIG. 1 shows a schematic depiction of a refrigerant circuit with a refrigerant compressor unit, operated by means of a converter.

A refrigerant circuit 10 depicted schematically in FIG. 1 comprises a refrigerant compressor unit 20, which has a refrigerant compressor 22 and an electric drive motor 24 driving the refrigerant compressor 22, the refrigerant compressor 22 and the drive motor 24 for example being suitable for integration in a single unit.

The refrigerant compressor 22 in the refrigerant circuit 10 compresses the refrigerant circulated in the circuit, the refrigerant then being fed in the refrigerant circuit 10 to a heat exchanger unit 12 which is arranged on the pressurised side of the circuit and in which the compressed refrigerant is cooled, in particular condensed, by dissipation of heat W.

The cooled, in particular condensed refrigerant is fed in the refrigerant circuit 10 to an expansion member 14, in which the compressed, in particular condensed and pressurised refrigerant is expanded and is then fed in the refrigerant circuit 10 to a heat exchanger unit 16, in which the expanded refrigerant is able to absorb heat W so as to thus provide its cooling effect.

The refrigerant expanded in the heat exchanger unit 16 is then fed again to the refrigerant compressor 22 and is compressed by the refrigerant compressor 22.

The expanded refrigerant, which has already absorbed heat in the heat exchanger unit 16, is thus fed at an inlet 32 to the refrigerant compressor 22 at a saturation temperature STE, is then compressed in the refrigerant compressor 22, and exits the refrigerant compressor at an outlet 34 at a saturation temperature STA.

The refrigerant compressor 22, depending on its construction and the refrigerant, operates without sustaining damage only with certain value pairs of the saturation temperature STE at the inlet 32 and the saturation temperature STA at the outlet 34 of the refrigerant compressor 22, these being defined by an application diagram 36 shown in FIG. 2, wherein in the application diagram 36 the saturation temperature STE at the inlet 32 is plotted on the X axis and the saturation temperature STA at the outlet 34 is plotted on the Y axis.

In this case, in the predefined application diagram 36, which in particular is also predefined depending on the refrigerant, all value pairs of the saturation temperature STE at the inlet 32 and of the saturation temperature STA at the outlet 34 of the refrigerant compressor 22 that are permissible for the refrigerant compressor 22 lie within an application field EF that is enclosed on all sides by an application limit EG.

Application Diagrams of this kind for refrigerant compressors are explained by way of example in the book "Lexikon der Kältetechnik" (Dictionary of Refrigeration Engineering) by Dieter Schmidt (published by C. F. Müller), to which reference is made in this regard.

The value pairs of the saturation temperature STE from the inlet 32 and the saturation temperature STA at the outlet 34 that are permissible within the application field EF each define a working state AZ of the refrigerant compressor 22 that can be achieved with the refrigerant compressor 22 in question.

Since the refrigerant compressor 22 is driven by the electric drive motor 24, each working state AZ requires a certain electrical power consumption PAZ of the drive motor 24.

The electrical power consumption value PAZ of the drive motor 24 is dependent here on the one hand on the particular working state AZ in the application field EF and on the other hand on the speed of the refrigerant compressor 22.

If the refrigerant compressor 22 is operated at different speeds by means of a frequency converter 40, the speed of the refrigerant compressor 22 is thus proportional to the operating frequency f supplied to the drive motor 24 by the frequency converter 40.

Thus, an electrical power consumption value PAZ is associated with each working state AZ within the application field EF at a certain operating frequency f.

However, the electrical power consumption value PAZ of the electric drive motor 24 is dependent not only on the working state AZ of the refrigerant compressor 22, but also on the type of electric drive motor 24 and the layout of the connection of the windings thereof to the frequency converter 40.

In the depicted exemplary embodiment, it is assumed that the electric drive motor 24 is an asynchronous motor, or perhaps a permanent-magnet motor, the windings of which are connected to the frequency converter 40 in a star layout.

This layout of connection of the drive motor 24 to the frequency converter 40 has the result that, as shown in FIG. 3, when the drive motor 24 is operated with the frequency converter, the output voltage $U_{FU}$ generated by the frequency converter 40, starting from the operating frequency f=0, increases linearly as operating frequency f increases until a cut-off frequency $f_{ECK}$ is reached, above which the output voltage $U_{FU}$ no longer increases, but has reached its maximum output voltage $U_{FUMAX}$.

With a further increase in the operating frequency f to a maximum frequency $f_{max}$, the output voltage $U_{FUMAX}$ at which the drive motor 24 is operated remains constant.

The maximum operating frequency $f_{max}$ of the frequency converter 40 for operating the electric drive motor is on the one hand contingent on the structure of the electric drive motor 24 and on the other hand on the structure of the refrigerant compressor 22 and is usually around values of 80 hertz or less, whereas the cut-off frequency $f_{ECK}$ usually lies in the range between 40 and 60 hertz.

In this operating mode of the electric drive motor 24, the operating current in the particular working state AZ is likewise dependent on the operating frequency f, thus resulting in working state operating current values $I_{AZ}$ which are constant between the operating frequency f=0 to $f_{eck}$, but increase further at operating frequencies f above the cut-off frequency $f_{ECK}$, for example up to the maximum operating frequency $f_{max}$.

The maximum output voltage $U_{FUMAX}$, which is available at the output of the frequency converter 40 for operating the drive motor 24, is proportional to the intermediate circuit voltage of the frequency converter 40 and thus proportional to the supply voltage of the frequency converter 40.

As shown in FIGS. 2 and 3, the power consumption value $P_{AZ1}$ in a working state AZ1 of the application diagram 36 is for example greater than in a working state AZ2 of the application diagram 36, which, as in FIG. 3, has the result that the working point operating current values $I_{AZ1}$ have higher values than the working point operating current values $I_{AZ2}$ in the working state AZ2.

It is thus shown in FIGS. 2 and 3 that the working state operating current values $I_{AZ}$ made available by the frequency converter 40 are dependent on the working states AZ, and therefore the frequency converter 40, depending on the working state AZ, must be able to generate working state operating current values $I_{AZ}$ of different size.

The costs of the frequency converter 40 are dependent on the maximum converter current value $I_{FUMAX}$ that a frequency converter 40 can make available, and the greater the maximum converter current value $I_{FUMAX}$ the higher the costs.

If the selection of the frequency converter 40 in accordance with the working state $AZ_S$ intended by the user of the refrigerant compressor unit 20 when the frequency converter is used, which working state may be for example the working state AZ1 or AZ2, and the selected operating frequency $f_S$ are now optimised, it is thus possible to optimise selection of the frequency converter 40 by taking into account the working state $AZ_S$ intended by the user and the operating frequencies $f_S$ in that the frequency converter 40 is selected taking into account the intended working state $AZ_S$ and operating frequency $f_S$ in such a way that the frequency converter 40 is selected so that the maximum converter current value $I_{FUMAX}$ is selected to be greater than the working state operating current value $I_{AZfs}$ necessary for the selected working state $AZ_S$ at the intended operating frequency $f_S$.

To do this, the working state operating current value $I_{AZfs}$ must be determined.

The working state operating current value $I_{AZfs}$ at the particular operating frequency $f_S$ is determined, as shown in FIG. 4, using a data processing unit 50, comprising an input unit 52, in particular combined with a display unit 53, for displaying the application diagram 36 and for selecting the working state $AZ_S$ and the operating frequency $f_S$.

For this purpose, the data processing unit 50 operates with experimentally determined drive data to characterise the drive motor 24 of the refrigerant compressor unit 20.

For example, in a first exemplary embodiment relating to an asynchronous motor it is provided for the power consumption values $P_{AZ}$ for the particular working states AZ in the application field EF of the refrigerant compressor unit 20 at the particular operating frequency f to be determined experimentally and to be stored in a memory 54 associated with the data processing unit 50 as experimental power consumption values $P_{AZEXf}$ in the form of a power data field.

These electrical power consumption values $P_{AZEXf}$ then provide the possibility, taking into account the Steinmetz equivalent circuit for the drive motor 24, shown in FIG. 5, and the known resistance values R and reactance values X, which are stored in a memory 56 associated with the data processing unit 50, of calculating the impedance Z according to formula (F1) of the drive motor 24 and then, comparing the experimentally determined power consumption value $P_{AZfs}$ at the selected operating frequency $f_S$ with the theoretical power consumption value $P_{AZ}$ of impedance Z, of ascertaining the slip s iteratively from the formula (F2), and then using the slip s to ascertain the working state operating current value $I_{AZfs}$ from the formula (F3) at the particular selected operating frequency $f_S$.

The relationships and formulas shown in FIG. 5 may vary slightly, depending on the approximations and assumptions made in the Steinmetz equivalent circuit.

A Steinmetz equivalent circuit with the associated formulas is described in the book "THE PERFORMANCE AND DESIGN OF ALTERNATING CURRENT MACHINES", by M. G. SAY, THIRD EDITION, 1958, in PITMAN PAPERBACKS, 1968, SBN 273 401998, pages 270 ff.

A similar Steinmetz equivalent circuit with the corresponding formulas can be found on Wikipedia under "Induction motor", as at 4 Apr. 2016, and the references cited there.

Proceeding from this working state operating current value $I_{AZfs}$, the appropriate frequency converter 40 is now determined in that the maximum converter current value $I_{FUMAX}$ made available by the frequency converter 40 must be greater than the working state operating current value $I_{Az}$fs ascertained for the particular working state AZ at the selected frequency $f_S$.

As a further constraint for the frequency converter 40 that is to be selected, a start-up current value $I_{ANLEX}$ for the particular refrigerant compressor unit 20 is also used, which has likewise been ascertained experimentally and stored in a memory 58 and may, where appropriate, be greater than the working state operating current value $I_{AZfs}$.

For starting up the refrigerant compressor unit 20, the frequency converter 40 is designed to be resistant to overload, such that a maximum converter start-up current value $I_{FUANLMAX}$ that is greater than the maximum converter current value $I_{FUMAX}$ is made available briefly, and for example may be 170% of the maximum converter current value $I_{FUMAX}$ for a period of three seconds.

In this way, for selection of the frequency converter 40, illustrated schematically in FIG. 4, it is relevant that the maximum converter current value $I_{FU}$ is greater than the working state operating current value $I_{AZfs}$, and the maximum converter start-up current value $I_{FUANLMAX}$ is greater than the start-up current value $I_{ANLEX}$ of the refrigerant compressor unit 20, as illustrated for example in FIG. 3, however, the maximum converter current $I_{FUMAX}$ and the maximum converter start-up current $I_{FUANLMAX}$ should be as close as possible to the working state operating current value $I_{AZfs}$ and the start-up current value $I_{ANLEX}$ in order to select a frequency converter with the smallest possible maximum converter current value $I_{FUMAXs}$, which represents the most economical solution.

With a frequency converter 40 selected in this way, because of the selection method it is ensured that the frequency converter is able to operate the refrigerant compressor unit 20 in the selected working state $AZ_s$, but a frequency converter 40 selected in this way does not ensure that the refrigerant compressor 22 can consequently be operated in all working states AZ within the application field EF.

Rather, this approach and the selection of the frequency converter 40 such that the frequency converter need only be able to supply the working state operating current $I_{AZfs}$ and the start-up current value $I_{ANLEX}$ have the effect of restricting the application field EF.

In order to display to a user the restriction of the application field EF that results from the selection made of the frequency converter 40, as illustrated for example in FIG. 6, and on the basis of the maximum converter current value $I_{FUMAXs}$ of the selected frequency converter 40s, the working states AZ in the application field EF that are associated with this maximum converter current value $I_{FUMAX}$ are ascertained for the selected operating frequency $f_s$ or indeed for other operating frequencies $f_s'$, using the equivalent circuit of the drive motor 24 illustrated in FIG. 5 with the known resistance values R and the known reactance values X from the memory 56, and using the formulas for electrical power consumption and working state operating current $I_{AZ}$ that are illustrated in FIG. 5 and are associated with the equivalent circuit of the drive motor 24, taking into account the power consumption values $P_{AZEX}$ stored in the memory 54 for the different working states AZ in the application field EF at the particular selected operating frequencies $f_s$.

For this purpose, the maximum converter current value $I_{FUMAXs}$ of the selected converter 40s is used for the current $I_{AZfs}$ according to the formula F3, the slip s is determined from this, and the formula F2 is used to calculate the power consumption value $P_{AZCAL}$, and then, using the experimental power consumption values $P_{AZEX}$ stored in the memory 54, all the working states AZCAL(fs) that correspond to the calculated power consumption value $P_{AZCAL}$ at the selected operating frequency fs are ascertained.

The sum of these working states $A_{ZCALfs}$ gives a boundary line $G_{fs}$ in the application diagram 36, as illustrated in FIG. 2.

This calculation results in the boundary lines $G_{fs}$ illustrated in FIG. 2 and FIG. 6 for different selected operating frequencies $f_s$; for example the boundary line $G_{fs}$ represents the boundary line for the application field EF at the operating frequency $f_s$ that is selected for selection of the frequency converter 40, the boundary line $G_{fr}$ represents for example a boundary line for the limit of the application field EF at a smaller operating frequency fr than the selected operating frequency fs, and the boundary line $G_{frr}$ represents for example a boundary line of the application field EF for an operating frequency frr selected to be even smaller, and these are displayed by the data processing unit 50 on a display unit 53 together with the application diagram 36.

Thus, a user of the method according to the invention is also at the same time provided with information regarding the restrictions resulting from the selection of the frequency converter 40 in accordance with the selection method described above, and a user can check whether these restrictions of the application field EF do or do not rule out possible potential working states AZ that could, where appropriate, also be applicable for use of the refrigerant compressor unit 20.

In a second exemplary embodiment, as illustrated in FIG. 7, as an alternative to the first exemplary embodiment, it is provided for the current $I_{Azf}$ to be ascertained in the manner described in conjunction with the first exemplary embodiment, using the data processing unit 50 for each experimentally determined power consumption value $P_{AZEXf}$ at the particular operating frequency f, using the resistance values R and reactance values X of the Steinmetz equivalent circuit that are known from FIG. 5 for each individual working state AZ, and to be stored in a memory 54' such that when a user makes a selection of the working state $AZ_s$ and the selected operating frequency $f_s$, the corresponding working state operating current value $I_{AZfs}$ may be accessed directly in the memory 56, and this working state operating current value $I_{AZfs}$ corresponding to the selected working state $AZ_s$ can be read off directly without further action, and, using the experimentally determined start-up current value $I_{ANLEX}$ the selection of the frequency converter 40s can be performed, using the maximum frequency converter currents $I_{FUMAX}$ stored in the memory 62, in the manner already described in conjunction with the first exemplary embodiment.

Similarly, in the second exemplary embodiment, once the frequency converter 40s has been established, the maximum frequency converter current $I_{FUMAXs}$ may be used to determine the working states $A_{ZCALfs}$ associated with this current value in the memory 54', and to display the sum of all these working states $AZCAL_{fs}$ as the particular boundary line $G_{fs}$ for example on a display unit 64, as described in conjunction with the first exemplary embodiment.

In a third exemplary embodiment, as an alternative to the first and second exemplary embodiments, it is provided, similarly to the second exemplary embodiment, for the working state operating current values $I_{Azf}$ to be determined experimentally in the memory 54' and stored in the memory 54' such that in the third exemplary embodiment, in a similar manner to the second exemplary embodiment, selection of the frequency converter 40s can use the values in the memory 54' as a starting point.

Similarly, and conversely, when determining the boundary lines $G_{fs}$, the data processing unit 50 can proceed in accordance with the second exemplary embodiment, with the experimentally determined working state operating current values $I_{Azf}$ being stored in the memory 54' and then used to ascertain the boundary line $G_f$ with the maximum converter current value $I_{FUMAXs}$ established by the selected frequency converter 40s.

The working state operating current value $I_{AZfs}$ at the particular operating frequency $f_s$ is determined in a fourth exemplary embodiment relating to a synchronous motor or a permanent-magnet synchronous motor, as shown in FIG. 9, using a data processing unit 50 comprising an input unit 52, in particular combined with a display unit 53 for displaying the application diagram 36 and for selecting the working state $AZ_s$ and the operating frequency $f_s$.

To do this, the data processing unit 50 uses experimentally determined drive data in order to characterise the drive motor 24' of the refrigerant compressor unit 20.

For example, in the fourth exemplary embodiment relating to a synchronous motor it is provided for the power consumption values $P_{AZ}$ for the particular working states AZ in the application field EF of the refrigerant compressor unit 20 at the particular operating frequency f to be determined experimentally and to be stored in a memory 54 associated with the data processing unit 50 as experimental power consumption values $P_{AZEXf}$ in the form of a power data field.

These electrical power consumption values $P_{AZEXf}$ then provide the possibility, taking into account the equivalent circuit for the drive motor 24', shown in FIG. 10, and the known resistance values R and reactance values X, which are stored in a memory 56 associated with the data processing unit 50, and comparing the experimentally determined power consumption value $P_{AZfs}$ at the selected operating frequency $f_S$ with the theoretical power consumption value $P_{AZ}$ in formula P2, of determining the load angle ϑ, iteratively using the formula P3, and of then using the load angle ϑ to ascertain the absolute value of the working state operating current value $I_{AZfs}$ from the formula P4 using the formula P3 at the particular selected operating frequency $f_S$.

The relationships and formulas shown in FIG. 10 may vary slightly, depending on the approximations and assumptions made in the equivalent circuit.

An equivalent circuit with the associated formulas is described in the document: Praktikum erneuerbare Energien, Versuch 3, Synchronmaschine (Practical Work in Renewable Energies, Test 3, Synchronous Machine), University of Stuttgart, ieW (Institute of Electrical Energy Conversion), as at April 2011.

A similar equivalent circuit with the corresponding formulas can be found on Wikipedia under "Synchronous motor" and the references cited there.

Proceeding from this working state operating current value $I_{AZfs}$, the appropriate frequency converter 40 is now ascertained in that the maximum converter current value $I_{FUMAX}$ made available by the frequency converter 40 must be greater than the working state operating current value $I_{AZ}$fs ascertained for the particular working state AZ at the selected frequency $f_S$.

As a further constraint for the frequency converter 40 that is to be selected, a start-up current value $I_{ANLEX}$ for the particular refrigerant compressor unit 20 is also used, which has likewise been ascertained experimentally and stored in a memory 58 and may, where appropriate, be greater than the working state operating current value $I_{AZfs}$.

For starting up the refrigerant compressor unit 20, the frequency converter 40 is designed to be resistant to overload, such that a maximum converter start-up current value $I_{FUANLMAX}$ that is greater than the maximum converter current value $I_{FUMAX}$ is made available briefly, and for example may be 170% of the maximum converter current value $I_{FUMAX}$ for a period of three seconds.

Thus, for selection of the frequency converter 40, illustrated schematically in FIG. 9, it is relevant that the maximum converter current value $I_{FU}$ is greater than the working state operating current value $I_{AZ}$fs, and the maximum converter start-up current value $I_{FUANLMAX}$ is greater than the start-up current value $I_{ANLEX}$ of the refrigerant compressor unit 20, as illustrated for example in FIG. 3, however, the maximum converter current $I_{FUMAX}$ and the maximum converter start-up current $I_{FUANLMAX}$ should be as close as possible to the working state operating current value $I_{AZfs}$ and the start-up current value $I_{ANLEX}$ in order to select a frequency converter with the smallest possible maximum converter current value $I_{FUMAXs}$, which represents the most economical solution.

With a frequency converter 40 selected in this way, because of the selection method it is ensured that the frequency converter is able to operate the refrigerant compressor unit 20 in the selected working state $AZ_s$, but a frequency converter 40 selected in this way does not ensure that the refrigerant compressor 22 can consequently be operated in all the working states AZ within the application field EF.

Rather, this approach and the selection of the frequency converter 40 such that the frequency converter need only be able to supply the working state operating current $I_{AZfs}$ and the start-up current value $I_{ANLEX}$ have the effect of restricting the application field EF.

In order to display to a user the restriction of the application field EF that results from the selection made of the frequency converter 40, as illustrated for example in FIG. 11, and on the basis of the maximum converter current value $I_{FUMAXs}$ of the selected frequency converter 40s, the working states AZ in the application field EF that are associated with this maximum converter current value $I_{FUMAX}$ are ascertained for the selected operating frequency $f_s$ or indeed for other operating frequencies $f_s$', using the equivalent circuit of the drive motor 24' illustrated in FIG. 10 with the known resistance values R and the known reactance values X from the memory 56, and using the formulas for electrical power consumption and working state operating current $I_{AZ}$ that are illustrated in FIG. 10 and are associated with the equivalent circuit of the drive motor 24, taking into account the power consumption values $P_{AZEX}$ stored in the memory 54 for the different working states AZ in the application field EF at the particular selected operating frequencies $f_s$.

For this purpose, the maximum converter current value $I_{FUMAXs}$ of the selected converter 40s is used for the absolute value of the current $I_{AZfs}$ according to the formula P4, the load angle $\vartheta$ is determined from this using formula P3, and the formula P2 is used to calculate the power consumption value $P_{AZCAL}$, and then, using the experimental power consumption values $P_{AZEX}$ stored in the memory 54, all the working states AZCAL(fs) that correspond to the calculated power consumption value $P_{AZCAL}$ at the selected operating frequency fs are ascertained.

The sum of these working states $A_{ZCALfs}$ gives a boundary line $G_{fs}$ in the application diagram 36, as illustrated in FIG. 2.

This calculation results in the boundary lines $G_{fs}$ illustrated in FIG. 2 and FIG. 11 for different selected operating frequencies $f_s$; for example the boundary line $G_{fs}$ represents the boundary line for the application field EF at the operating frequency $f_s$ that is selected for selection of the frequency converter 40, the boundary line $G_{fr}$ represents for example a boundary line for the limit of the application field EF at a smaller operating frequency fr than the selected operating frequency fs, and the boundary line $G_{frr}$ represents for example a boundary line of the application field EF for an operating frequency fr selected to be even smaller, and these are displayed by the data processing unit 50 on a display unit 53 together with the application diagram 36.

Thus, a user of the method according to the invention is also at the same time provided with information regarding the restrictions resulting from the selection of the frequency converter 40 in accordance with the selection method described above, and a user can check whether these restrictions of the application field EF do or do not rule out possible potential working states AZ that could, where appropriate, also be applicable for use of the refrigerant compressor unit 20.

In a fifth exemplary embodiment relating to a permanent-magnet motor, as illustrated in FIG. 12, alternatively to the first exemplary embodiment it is provided for the current $I_{AZf}$ to be ascertained in the manner described in conjunction with the first exemplary embodiment, using the data processing unit 50 for each experimentally determined power consumption value $P_{AZEXf}$ at the particular operating frequency f, using the resistance values R and reactance values X of the equivalent circuit that are known from FIG. 10 for each individual working state AZ, and to be stored in a memory 54' such that when a user makes a selection of the working state $AZ_s$ and the selected operating frequency $f_s$, the corresponding working state operating current value $I_{AZfs}$ may be accessed directly in the memory 56, and this working state operating current value $I_{AZfs}$ corresponding to the selected working state $AZ_s$ can be read off directly without further action, and, using the experimentally determined start-up current value $I_{ANLEX}$ the selection of the frequency converter 40s can be performed, using the maximum frequency converter currents $I_{FUMAX}$ stored in the memory 62, in the manner already described in conjunction with the first exemplary embodiment.

Figure 13:
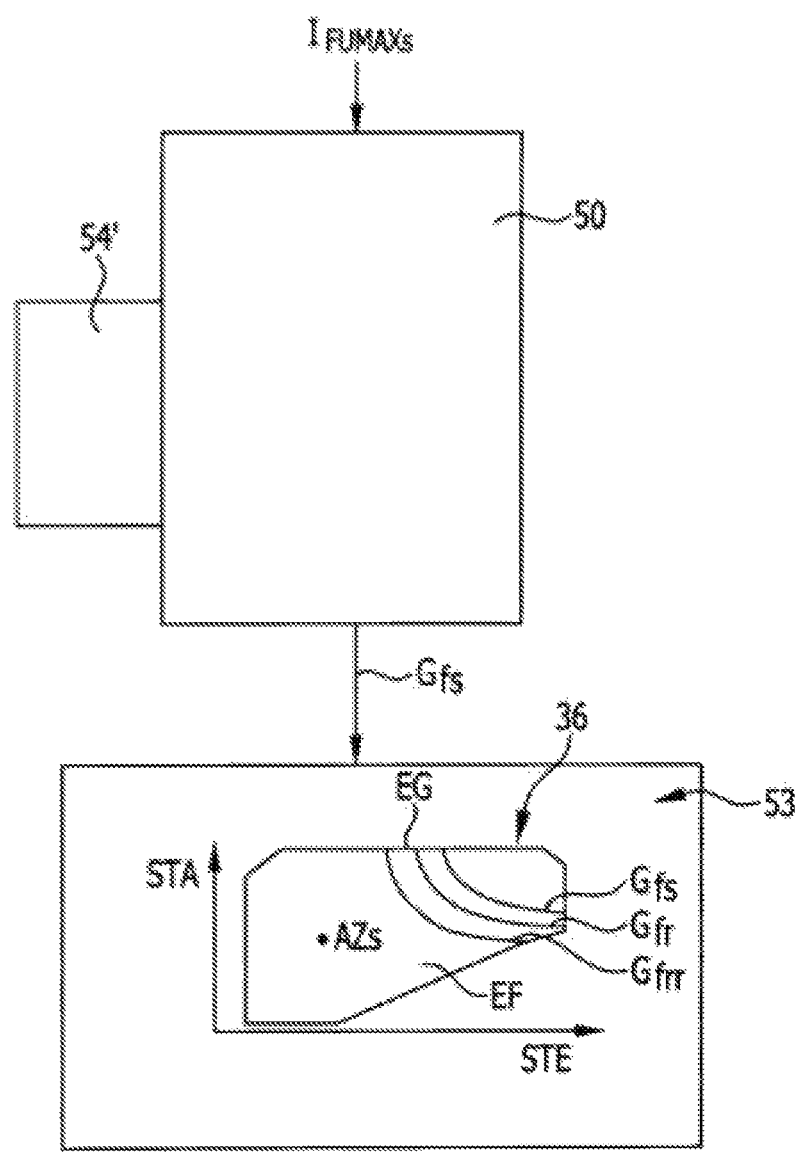
FIG. 13 shows a schematic depiction of the fifth exemplary embodiment of the frequency converter according to the invention when determining the restrictions of the application field.

Similarly, in the fifth exemplary embodiment, once the frequency converter 40s has been established, the maximum frequency converter current $I_{FUMAXs}$ may be used to determine the working states $AZCAL_{fs}$ associated with this current value in the memory 54', and to display the sum of all these working states $AZCAL_{fs}$ as the particular boundary line $G_{fs}$ for example on a display unit 64, as described in conjunction with the fourth exemplary embodiment (FIG. 13).

In a sixth exemplary embodiment, as an alternative to the fourth and fifth exemplary embodiments, it is provided, similarly to the second exemplary embodiment, for the working state operating current values $I_{AZf}$ to be determined experimentally in the memory 54' and stored in the memory 54' such that in the sixth exemplary embodiment, in a similar manner to the fifth exemplary embodiment, selection of the frequency converter 40s can use the values in the memory 54' as a starting point.

Similarly, and conversely, when determining the boundary lines $G_{fs}$, the data processing unit 50 can proceed in accordance with the second exemplary embodiment, with the experimentally determined working state operating current values $I_{AZf}$ being stored in the memory 54' and then used to determine the boundary line $G_f$ with the maximum converter current value $I_{FUMAXs}$ established by the selected frequency converter 40s.

Preferably, the frequency of the frequency converter 40s used is controlled by a frequency control unit 70, which on the one hand detects the saturation temperature STE or, as an alternative, detects the saturation pressure at the input 32 of the refrigerant compressor 22 and supplies it to a comparator member 74, to the other side of which there is applied a temperature specifying signal TV.

Depending on how much the saturation temperature STE deviates from the temperature specifying signal TV, a proportional regulator 76 is controlled, and this generates a frequency request signal FAS that is supplied to a frequency converter controller 78 which then, in a manner corresponding to the frequency request signal FAS, specifies the frequency f of the frequency converter 40s at which the drive motor 24 is then operated.

If selection of the frequency converter 40s is made in accordance with one of the exemplary embodiments described above, then, as illustrated in FIG. 3, when the refrigerant compressor unit 20 is operated, as in FIGS. 2 and 3, a working state AZ3 may occur in which the working state operating current $I_{AZ3}$ as illustrated in FIG. 3 is sufficiently high for it to happen, at frequencies f above the cut-off frequency $f_{ECK}$, that the maximum converter current value $I_{FUMAX}$ is already reached at a limit frequency $f_L$, wherein the limit frequency $f_L$ is lower than the operating frequency $f_s$ provided for example for the working state AZ1.

This would have the result, in a conventional structure, that the frequency converter 40s would switch off because of overload.

Figure 14:
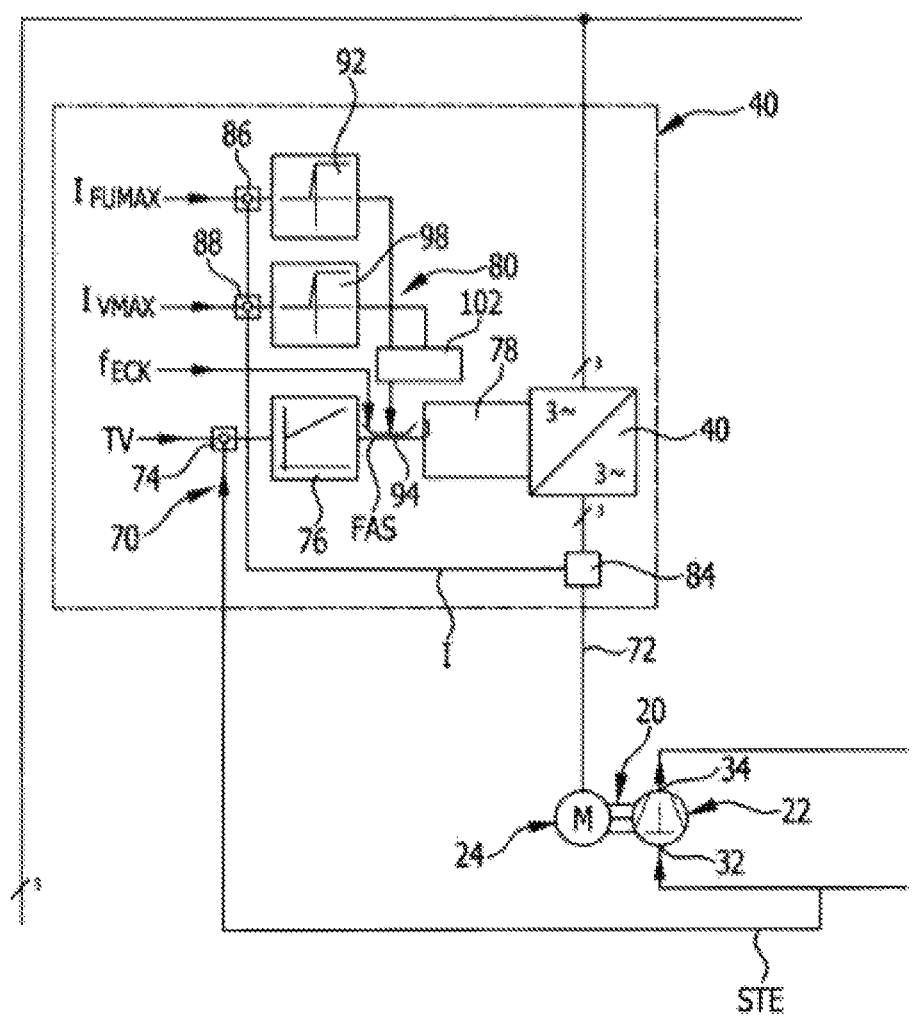
FIG. 14 shows a schematic depiction of a frequency converter with a frequency-limiting unit.

For this reason, with a frequency converter 40 according to the invention, as illustrated in FIG. 14, a frequency-limiting unit 80 is provided that limits the operating frequency f of the frequency converter 40 when it is above the cut-off frequency $f_{ECK}$ such that the working state operating current value $I_{AZ}$ does not exceed the maximum converter current value $I_{FUMAXs}$ but at most reaches the maximum converter current value $I_{FUMAXs}$.

This ensures that the frequency converter 40 does not switch off even in working states that, at operating frequencies f above the cut-off frequency $f_{ECK}$, could result in a current of the frequency converter 40 exceeding the maximum converter current value $I_{FUMAX}$.

As illustrated in FIG. 14, the frequency-limiting unit 80 includes a current sensor 84 that is arranged in a supply line 72 leading from the frequency converter 40s to the drive motor 24 and that measures the actual working state operating current value $I_{AZ}$ and supplies it to a comparator member 86, which compares the actual working state operating current value $I_{AZ}$ with the maximum converter current value $I_{FUMAX}$ as a predetermined value and supplies the comparison result to a limit regulator 92, for example a proportional regulator, which, if the working state operating current $I_{AZ}$ actually measured by the current sensor 84 is greater than the maximum converter current value $I_{FUMAX}$ serving as a reference value, generates a frequency-limiting signal for a frequency-limiting member 94 that acts on the frequency request signal FAS and prevents a further increase in the operating frequency f.

Preferably, there is additionally provided a comparator member 88 coupled to the current sensor 84, which comparator member compares the working state operating current value $I_{AZ}$ measured by the current sensor 84 with a maximum compressor operating current value $I_{VMAX}$ and controls a limit regulator 98, for example a proportional regulator, which, when the working state operating current value $I_{AZ}$ actually measured by the current sensor 84 approximates to the maximum compressor operating current value, $I_{VMAX}$, likewise generates a frequency-limiting signal and transmits it to the frequency-limiting member 94.

Preferably, the frequency-limiting signals of the limit regulators 92 and 98 are compared with one another in a minimising member 102, and in each case the frequency-limiting signal that leads to the lowest limit frequency $f_L$ is supplied to the frequency-limiting member 94.

Further, the cut-off frequency $f_{ECK}$, which represents the minimum frequency at which frequency restriction is performed by the frequency-limiting member 94, is preferably also transmitted to the frequency-limiting member 94 as a reference value.

For optimum operation of the frequency converter 40, the increase in the output voltage $U_{FU}$ of the frequency converter 40 with reference to the frequency f in the range of from f=0 to f=$f_{ECK}$ is significant, since the increase in the output voltage $U_{FU}$ with reference to the frequency f of the frequency converter 40 is relevant for forming the flow in the drive motor 24.

Provided the maximum output voltage $U_{FUMAX}$ is constant, this has the consequence that the cut-off frequency $f_{ECK}$ can also be constant, with the result that the increase in the output voltage $U_{FU}$ with reference to the frequency f is likewise always constant.

If, however, with a frequency converter 40s the supply voltage fluctuates, for example as a result of a poor-quality supply network, then the maximum output voltage $U_{FUMAX}$ of the frequency converter 40 at its output is not constant, and therefore with a constant cut-off frequency $f_{ECK}$ the increase in the output voltage $U_{FU}$ would necessarily vary in the frequency range between f=0 and f=$f_{ECK}$.

In order to keep the increase in the output voltage $U_{FU}$ with reference to the frequency constant, even with notable fluctuations in the supply network and thus a notable fluctuation in the maximum output voltage $U_{FUMAX}$ of the frequency converter 40, it is also necessary to vary the cut-off frequency $f_{ECK}$ in a manner corresponding with the variation in the maximum output voltage $U_{FUMAX}$.

Figure 15:
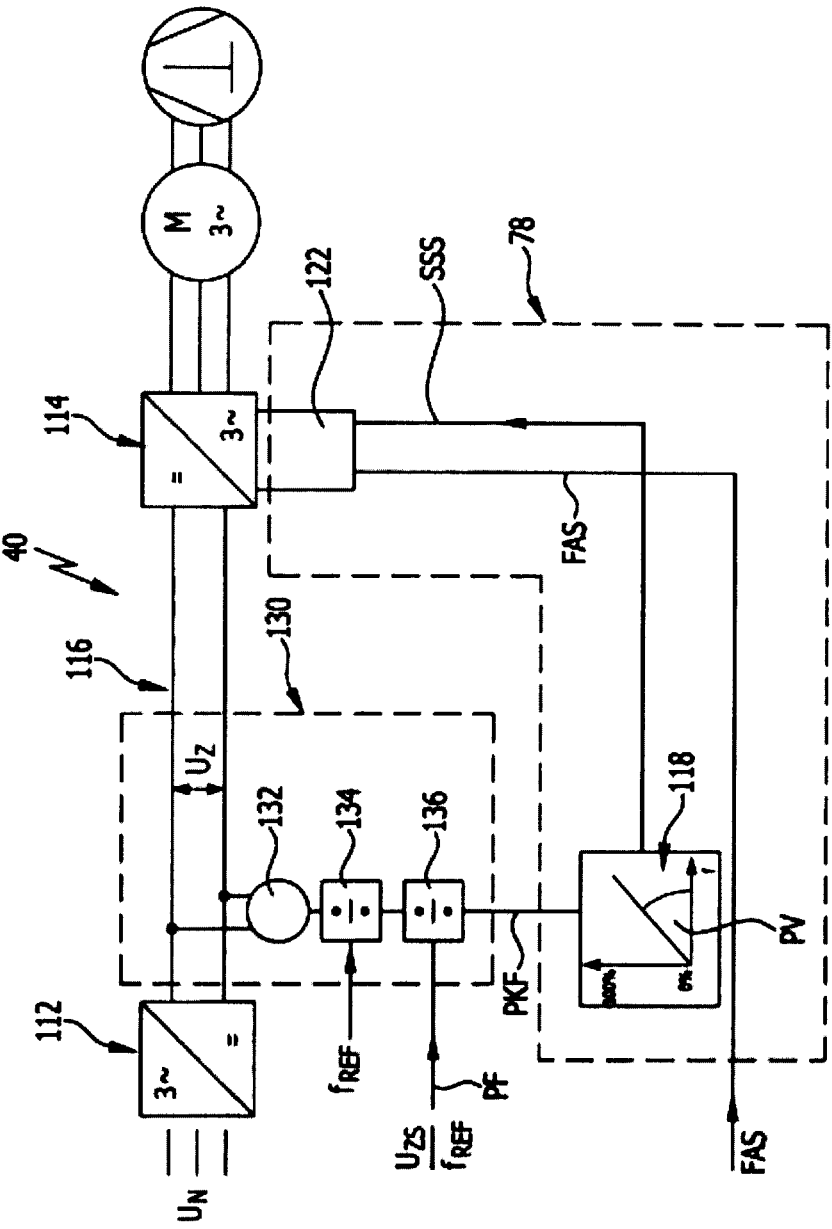
FIG. 15 shows a schematic depiction of a frequency converter with a voltage adjustment unit.

A conventional frequency converter 40, illustrated in FIG. 15, includes a rectifier stage 112, an inverter stage 114 and an intermediate circuit 116 that is provided between the rectifier stage 112 and the inverter stage 114, across which intermediate circuit the intermediate circuit voltage $U_Z$ is applied as a DC voltage.

Here, the intermediate circuit voltage $U_Z$ depends on the mains voltage $U_N$ supplied to the rectifier stage 112, and fluctuates proportionally to the mains voltage UN.

Here, the inverter stage 114 of the frequency converter 40 is controlled by the frequency converter controller 78, to which the frequency request signal FAS is supplied.

Here, on the basis of the frequency request signal FAS and with the aid of a proportional member 118, the frequency converter controller 78 generates a voltage control signal SSS, which is supplied in addition to the frequency request signal FAS to an inverter stage controller 122, which generates the output voltage $U_{FU}$ on the basis of the frequency request signal FAS and the voltage control signal SSS, which specifies for example percentage values of the maximum output voltage $U_{FUMAX}$.

For adapting to drastically fluctuating mains voltages $U_N$, there is thus associated with the frequency converter 40 a voltage adjustment unit 130 that uses a voltage measuring unit 132 to measure the intermediate circuit voltage $U_Z$ in the intermediate circuit 116 and supplies this intermediate circuit voltage $U_Z$ to a dividing member 134, to which a reference frequency $f_{REF}$ is also supplied.

The reference frequency $f_{REF}$ is of a size such that, with a setpoint value $U_{ZS}$ of the intermediate circuit voltage $U_Z$, the result is the proportionality factor that is desired for the increase in output voltage $U_{FU}$ of the converter 40 with reference to the frequency F.

The result from this dividing member 134 is supplied to a further dividing member 136 to which on the other hand there is supplied the desired proportionality factor PF for the increase in output voltage $U_{FU}$ of the frequency converter 40 with reference to the operating frequency f, which corresponds to the intermediate circuit voltage setpoint value $U_{ZS}$ divided by the reference frequency $f_{REF}$.

The result from the second dividing member 136 is a proportionality correction factor PKF which is equal to 1 if the result from the first dividing member 134 that is supplied to this dividing member 136 corresponds to the desired proportionality factor, and is not equal to 1 if the intermediate circuit voltage $U_Z$ differs from the intermediate circuit voltage setpoint value $U_{ZS}$.

If the proportionality correction factor PKF generated by the dividing member 136 is now supplied to the proportional member 118, then it can be used to vary the proportionality behaviour PV provided in the proportional member 118 between the operating frequency f of the frequency request signal FAS and the voltage control signal SSS.

FIG. 16 illustrates for example how the proportionality between the operating frequency f of the frequency request signal FAS and the voltage control signal SSS varies.

Here, the function of the voltage adjustment unit 130 is that, when the intermediate circuit voltage $U_Z$ corresponds to the intermediate circuit voltage setpoint value $U_{ZS}$, as illustrated in FIG. 16, the cut-off frequency corresponds to the setpoint cut-off frequency $f_{ECKSO}$, which is for example 50 hertz.

If the intermediate circuit voltage $U_Z$ differs from the intermediate circuit voltage setpoint value $U_{ZS}$ by the value Δ, for example giving smaller voltage values, then the voltage control signal SSS of 100% will be reached at operating frequencies lower than the setpoint cut-off frequency $f_{ECKSO}$.

If, by contrast, the intermediate circuit voltage $U_Z$ is greater than the intermediate circuit voltage setpoint value $U_{ZS}$ by the value Δ, then the voltage control signal SSS of 100% will be reached at operating frequencies f higher than the setpoint cut-off frequency $f_{ECKSO}$.

As illustrated in FIG. 17, this results in the cut-off frequency $f_{ECK}$, that is to say the frequency at which the maximum output voltage $U_{FUMAX}$ is reached at the output of the frequency converter 40, varying in particular in accordance with the deviation in the intermediate circuit voltage $U_Z$ from the intermediate circuit voltage setpoint value $U_{ZS}$, with the result that the maximum output voltage $U_{FUMAX}$ of the frequency converter 40 also varies.

The invention claimed is:

1. A method for selecting a frequency converter for a refrigerant compressor unit having a refrigerant compressor and an electric drive motor, the method comprising the steps of:
using an application diagram showing a saturation temperature at an inlet and a saturation temperature at an outlet of the refrigerant compressor and showing all permissible value pairs of the saturation temperature at the inlet and the saturation temperature at the outlet of the refrigerant compressor arranged in an application field enclosed on all sides by an application limit;
selecting a working state suitable for the operation of the refrigerant compressor within the application field of the application diagram of the refrigerant compressor;
selecting an operating frequency for this selected working state; and
using the selected working state and the selected operating frequency to extract experimentally-determined drive data for said refrigerant compressor unit, stored for each working state in said application field and the selected operating frequency of the refrigerant compressor unit, to determine, on the basis of the stored experimentally-determined drive data, a working state operating current value corresponding to the selected working state and the selected operating frequency for the operation of the refrigerant compressor unit.

2. A method for selecting a frequency converter for a refrigerant compressor unit having a refrigerant compressor and an electric drive motor, the method comprising the steps of:
using an application diagram showing a saturation temperature at an inlet and a saturation temperature at an outlet of the refrigerant compressor and showing all permissible value pairs of the saturation temperature at the inlet and the saturation temperature at the outlet of the refrigerant compressor arranged in an application field enclosed on all sides by an application limit;
selecting a working state suitable for the operation of the refrigerant compressor within the application field of the application diagram of the refrigerant compressor;
selecting an operating frequency for this selected working state; and
using the selected working state to extract experimentally-determined drive data for said refrigerant compressor unit, stored for each working state in said application field and using the selected operating frequency of the refrigerant compressor unit, to determine, on the basis of the stored experimentally-determined drive data, a working state operating current value corresponding to the selected working state and the selected operating frequency for the operation of the refrigerant compressor unit.

3. The method in accordance with claim 2, wherein, on the basis of the working state operating current value, the frequency converter of which the maximum converter current value is equal to or greater than the ascertained working state operating current value is selected from data for those frequency converters that are available for selection.

4. The method in accordance with claim 3, wherein the frequency converter of which the maximum converter current value is closest to the working state operating current value is selected.

5. The method in accordance with claim 2, wherein the frequency converter is selected such that its maximum converter start-up current value is equal to or greater than a start-up current value of the refrigerant compressor unit.

6. The method in accordance with claim 5, wherein a stored start-up current value is consulted for the selection of the frequency converter.

7. The method in accordance with claim 5, wherein the start-up current value is determined experimentally.

8. The method in accordance with claim 5, wherein the frequency converter is selected such that its maximum converter start-up current value is closer to the start-up current value than that of any other frequency converter.

9. The method in accordance with claim 5, wherein the frequency converter is selected such that its maximum converter current value is closer to the higher of the values of the working state operating current and start-up current than that of any other frequency converter.

10. The method in accordance with claim 2, wherein the operating frequency to be selected lies in the range of from 0 hertz to 140 hertz.

11. The method in accordance with claim 2, wherein the drive data comprise the experimentally determined power consumption for each working state in the application field at the various operating frequencies.

12. The method in accordance with claim 11, wherein the working state operating current value at the selected operating frequency is calculated on the basis of the experimentally ascertained electrical power consumption at the particular operating frequency taking into consideration an equivalent circuit of the drive motor of the refrigerant compressor unit.

13. The method in accordance with claim 2, wherein impedance of an equivalent circuit impedance of the equivalent circuit of the drive motor is taken into consideration in order to ascertain the working state operating current value.

14. The method in accordance with claim 13, wherein, in order to ascertain the working state operating current value, the experimentally ascertained electrical power consumption of the refrigerant compressor unit is compared with the power consumption resulting from the equivalent circuit and on this basis the slip or load angle is ascertained.

15. The method in accordance with claim 13, wherein the working state operating current value is ascertained on the basis of the ascertained slip or load angle and the impedance of the equivalent circuit of the drive motor.

16. The method in accordance with claim 2, wherein the working state operating current value is minimized by varying the output voltage of the frequency converter.

17. The method in accordance with claim 2, wherein the experimentally determined electrical power consumption of each working state in the application field at the particular operating frequency is captured, in particular stored.

18. The method in accordance with claim 2, wherein the working state operating current values calculated from the experimentally ascertained electrical power consumption are captured, in particular stored, for each working state and for each operating frequency.

19. The method in accordance with claim 2, wherein the working state operating current value is experimentally ascertained and captured, in particular stored, for each working state and each operating frequency.

20. The method in accordance with claim 2, wherein, on the basis of the maximum converter current value of the selected frequency converter, the working states belonging to this maximum converter current value are ascertained in the application field at a selected operating frequency with the aid of the drive data.

21. The method in accordance with claim 20, wherein the working states ascertained in respect of the maximum converter current value are displayed visually in the application diagram.

22. The method in accordance with claim 2, wherein there are selected only frequency converters that comprise a frequency-limiting unit, which, at operating frequencies above a cut-off frequency, limits the operating frequency in such a way that the maximum converter current value of the frequency converter is not exceeded.

23. The method in accordance with claim 22, wherein the working state operating current value of the frequency converter is continuously detected by the frequency-limiting unit.

24. The method in accordance with claim 22, wherein the working state operating current value of the frequency converter is compared with a current reference value, and the operating frequency is limited to a limit frequency which is present when the current reference value is reached.

25. The method in accordance with claim 24, wherein the frequency-limiting unit takes into consideration both the maximum converter current value and also the maximum compressor operating current value as current reference value and ascertains the limit frequency on the basis of the lowest of the maximum current values.

26. The method in accordance with claim 2, wherein there is available for selection only a frequency converter with which, by means of a voltage adjustment unit, the output voltage increases with reference to the operating frequency independently of a fluctuation of a mains voltage.

27. The method in accordance with claim 26, wherein an intermediate circuit voltage of the frequency converter is measured and, by way of a comparison with at least one reference value, a voltage curve of the output voltage is corrected.

28. The method carried out by a data processing unit, comprising the method steps in accordance with claim 2.

29. A computer program product comprising commands which, when the program is run by a computer, cause the computer to carry out the method in accordance with claim 2.

30. A data processing unit for selecting a frequency converter for a refrigerant compressor unit having a refrigerant compressor and an electric drive motor, the data processing unit comprising:
a display unit presenting an application diagram showing a saturation temperature at an inlet and a saturation temperature at an outlet of the refrigerant compressor and showing all permissible value pairs of the saturation temperature at the inlet and the saturation temperature at the outlet of the refrigerant compressor arranged in an application field enclosed on all sides by an application limit,
selecting on said display unit within said application field of said application diagram of the refrigerant compressor a working state suitable for the operation of the refrigerant compressor unit, using said selected working state to extract experimentally determined drive data for said refrigerant compressor unit stored in a memory for each working state in said application field, and selecting an operating frequency for this selected working state, and, on the basis of the experimentally determined drive data associated with the selected working state and the selected operating frequency, a working state operating current value corresponding to the selected working state and the selected operating frequency is ascertained by the data processing unit for the operation of the refrigerant compressor unit.

31. The data processing unit in accordance with claim 30, wherein the data processing unit, on the basis of the working state operating current value, selects the frequency converter of which the maximum converter current value is equal to or greater than the ascertained working state operating current value from stored data for those frequency converters that are available for selection.

32. The data processing unit in accordance with claim 31, wherein the data processing unit selects the frequency converter of which the maximum converter current value is closest to the working state operating current value.

33. The data processing unit in accordance with claim 30, wherein the data processing unit selects the frequency converter is selected such that its maximum converter start-up current value is equal to or greater than a start-up current value of the refrigerant compressor unit.

34. The data processing unit in accordance with claim 33, wherein, for the selection of the frequency converter, the data processing unit consults a start-up current value stored in a memory.

35. The data processing unit in accordance with claim 33, wherein the start-up current value is determined experimentally.

36. The data processing unit in accordance with claim 33, wherein the data processing unit selects the frequency converter which has a maximum converter current value that is closest to the start-up current value.

37. The data processing unit in accordance with claim 33, wherein the data processing unit selects the frequency converter which has a maximum converter current value that is closest to the higher of the values of the working state operating current and start-up current.

38. The data processing unit in accordance with claim 30, wherein the drive data are determined experimentally.

39. The data processing unit in accordance with claim 30, wherein experimental drive data for the possible operating frequencies to be selected are stored in the memory for each working state of the refrigerant compressor unit.

40. The data processing unit in accordance with claim 30, wherein the operating frequency to be selected lies in the range of from 0 hertz to 140 hertz.

41. The data processing unit in accordance with claim 30, wherein the drive data comprise the experimentally determined power consumption for each working state in the application field at the various operating frequencies.

42. The data processing unit in accordance with claim 41, wherein the data processing unit calculates the working state operating current value at the selected operating frequency on the basis of the experimentally ascertained electrical power consumption at the particular operating frequency taking into consideration an equivalent circuit of the drive motor of the refrigerant compressor unit.

43. The data processing unit in accordance with claim 30, wherein impedance of an equivalent circuit of the drive motor is taken into consideration by the data processing unit in order to ascertain the working state operating current value.

44. The data processing unit in accordance with claim 41, wherein, in order to ascertain the working state operating current value, the data processing unit compares the experimentally ascertained electrical power consumption of the refrigerant compressor unit with the power consumption resulting from the equivalent circuit and on this basis ascertains the slip or load angle.

45. The data processing unit in accordance with claim 43, wherein the data processing unit ascertains the working state operating current value on the basis of the ascertained slip or load angle and the impedance of the equivalent circuit of the drive motor.

46. The data processing unit in accordance with claim 30, wherein the display unit can be used to vary the output voltage of the frequency converter in order to ascertain the working state operating current value, and, for the selection of the frequency converter, takes into consideration the output voltage of the frequency converter corresponding to a minimum of the working state operating current value.

47. The data processing unit in accordance with claim 30, wherein the data processing unit stores the experimentally determined electrical power consumption of each working state in the application field at the particular operating frequency.

48. The data processing unit in accordance with claim 30, wherein the data processing unit stores the working state operating current values calculated from the experimentally ascertained electrical power consumption for each working state and for each operating frequency.

49. The data processing unit in accordance with claim 30, wherein the working state operating current value is experimentally ascertained and stored by the data processing unit for each working state and for each operating frequency.

50. The data processing unit in accordance with claim 30, wherein the data processing unit, on the basis of the maximum converter current value of the selected frequency converter, ascertains the working states belonging to this maximum converter current value in the application field at a selected operating frequency with the aid of the drive data.

51. The data processing unit in accordance with claim 50, wherein the data processing unit displays the working states ascertained in respect of the maximum converter current value on the display unit in the application diagram.

52. The data processing unit in accordance with claim 30, wherein the data processing unit selects only frequency converters that comprise a frequency-limiting unit, which, at operating frequencies above a cut-off frequency, limits the operating frequency in such a way that the maximum converter current value of the frequency converter is not exceeded.

53. The data processing unit in accordance with claim 52, wherein the working state operating current value of the frequency converter is continuously detected by the frequency-limiting unit.

54. The data processing unit in accordance with claim 52, wherein the working state operating current value of the frequency converter is compared with a current reference value, and the operating frequency is limited to a limit frequency which is present when the current reference value is reached.

55. The data processing unit in accordance with claim 54, wherein the frequency-limiting unit considers both the maximum converter current value and also the maximum compressor operating current value as current reference value and ascertains the limit frequency on the basis of the lowest of the maximum current values.

56. The data processing unit in accordance with claim 30, wherein there is available for selection by the data processing unit only a frequency converter with which, by means of a voltage adjustment unit, the output voltage increases with reference to the operating frequency independently of a fluctuation of a mains voltage.

57. The data processing unit in accordance with claim 56, wherein an intermediate circuit voltage of the frequency converter is measured and, by way of a comparison with at least one reference value, a voltage curve of the output voltage is corrected.

* * * * *

UNITED STATES PATENT AND TRADEMARK OFFICE
CERTIFICATE OF CORRECTION

PATENT NO. : 11,736,053 B2  
APPLICATION NO. : 16/857746  
DATED : August 22, 2023  
INVENTOR(S) : John Gibson et al.

Page 1 of 1

It is certified that error appears in the above-identified patent and that said Letters Patent is hereby corrected as shown below:

In the Claims

Column 21, Line 4, Claim 13, reads "The method in accordance with claim 2, wherein..." and should read -- The method in accordance with claim 12, wherein... --

Column 21, Lines 5-6, Claim 13, reads "impedance of an equivalent circuit impedance of the equivalent circuit of the drive motor is taken into consideration in..." and should read -- impedance of an equivalent circuit of the drive motor is taken into consideration in... --

Signed and Sealed this  
Tenth Day of September, 2024

Katherine Kelly Vidal  
*Director of the United States Patent and Trademark Office*